(12) United States Patent
Sugiura

(10) Patent No.: US 8,181,614 B2
(45) Date of Patent: May 22, 2012

(54) INTERNAL COMBUSTION ENGINE AND VEHICLE INCORPORATING SAME

(75) Inventor: Hiroyuki Sugiura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 12/702,530

(22) Filed: Feb. 9, 2010

(65) Prior Publication Data

US 2010/0223915 A1    Sep. 9, 2010

(30) Foreign Application Priority Data

Mar. 9, 2009   (JP) ................................ 2009-055595

(51) Int. Cl.
*F01L 1/34* (2006.01)
(52) U.S. Cl. ................. 123/90.16; 123/90.31; 123/90.6; 123/193.5; 123/195 C
(58) Field of Classification Search ............... 123/90.16, 123/90.27, 90.31, 90.44, 90.6, 193.5, 195 C, 123/193.3, 198 F
See application file for complete search history.

(56) References Cited

U.S. PATENT DOCUMENTS 7,305,948 B2 * 12/2007 Heintzen et al. ........... 123/90.17

FOREIGN PATENT DOCUMENTS

JP             62-53688          11/1987

\* cited by examiner

*Primary Examiner* — Ching Chang
(74) *Attorney, Agent, or Firm* — Carrier Blackman & Associates, P.C.; William D. Blackman; Joseph P. Carrier

(57) ABSTRACT

An internal combustion engine includes a main enlarged member extended towards a camshaft for forming reed valve chambers. The main enlarged member is integrally provided on a head cover of the engine at a location at which reed valves for controlling supply of secondary air to an exhaust system are disposed. The main enlarged member is extended towards the camshaft for increasing volume of the reed valve chambers while avoiding the increase in size of the head cover. A recessed portion is provided on a cam cap fastened to a cylinder head of the engine. A portion of the main enlarged member is inserted into the recessed portion such that cam cap cooperates with the cylinder head for rotatably supporting the camshaft.

20 Claims, 16 Drawing Sheets

INTERNAL COMBUSTION ENGINE AND VEHICLE INCORPORATING SAME

CROSS-REFERENCE TO RELATED APPLICATIONS

The present invention claims priority under 35 USC 119 based on Japanese patent application No. 2009-055595, filed on Mar. 9, 2009. The entire subject matter of this priority document, including specification claims and drawings thereof, is incorporated by reference herein.

BACKGROUND OF THE INVENTION

1. Field of the Invention

The present invention relates to an internal combustion engine, and to a vehicle incorporating the same. More particularly, the present invention relates to an internal combustion engine having a reed valve for controlling supply of secondary air to an exhaust system, disposed on a head cover which cooperates with a cylinder head to form a valve motion chamber for accommodating a valve motion apparatus including a camshaft and a main enlarged member extended towards the camshaft for forming form a reed valve chamber integrally provided with the head cover at a location at which the reed valve is disposed, the reed valve chamber being configured to accommodate the reed valve therein, and to a vehicle incorporating the same.

2. Description of the Background Art

There is a known internal combustion engine similar to as described above, for example, as shown in the Japanese Patent Publication No. Sho 62-53688.

It is sometimes required to increase the amount of secondary air introduced into an exhaust system depending on the cylinder capacity of an internal combustion engine. In such circumstances, it is necessary to increase the volume of a reed valve chamber. If it is tried to increase the swelling amount of an enlarged member (by extending the enlarged member) provided on a head cover to the camshaft side in order to satisfy such demand of increasing volume of the reed valve chamber, it is necessary to avoid interference of the enlarged member with a cam of the camshaft. It may also be necessary to avoid interference of the enlarged member with a cam cap which rotatably supports the camshaft with respect to the cylinder head.

Therefore, the swelling amount to the camshaft side is restricted, and where the volume is insufficient, it is necessary to form the enlarged member so as to be extended to the outside of the head cover to increase volume of the reed valve chamber.

However, if the enlarged member is extended (extended) to the outside of the head cover to assure a necessary volume for the reed valve chamber, increase in size of the head cover is required, and interference with some parts around the head cover becomes a problem.

The present invention has been made in view of the situation described above. Accordingly, it is one of the objects of the present invention to provide an internal combustion engine in which the volume of a reed valve chamber is increased while avoiding increase in size of a head cover of the engine.

SUMMARY OF THE INVENTION

In order to achieve the above objects, the present invention according to a first aspect thereof provides an internal combustion engine wherein a reed valve for controlling supply of secondary air supplied to an exhaust system is disposed on a head cover. The head cover cooperates with a cylinder head for forming a valve motion chamber for accommodating a valve motion apparatus including a camshaft and a main enlarged member which is extended towards the camshaft for forming a reed valve chamber for accommodating the reed valve. The enlarged main member is integrally provided on the head cover at a location at which the reed valve is disposed. The present invention according to the first aspect thereof is characterized in that a recessed portion in which part of the main enlarged member is inserted is provided on a cam cap fastened to the cylinder head in such a manner as to cooperate with the cylinder head for rotatably supporting the camshaft.

Further, present invention according to a second aspect thereof, in addition to the first aspect, is characterized in that the cam cap includes a pair of bearing portions for sandwiching a plurality of cams provided on the camshaft therebetween and for cooperating with the cylinder head for rotatably supporting the camshaft. The cam cap also includes a connecting portion integrated with the bearing portions for connecting both of the bearing portions to each other. The recessed portion is provided on the connecting portion.

The present invention according to a third aspect thereof, in addition to one of the first and second aspects, is characterized in that that an extending portion is provided on the connecting portion such that a portion of the main enlarged member is disposed therein.

The present invention according to a fourth aspect thereof, in addition to one of the second and third aspects, is characterized in that a second enlarged member which is disposed between the pair of cams provided on the camshaft, and is further extended from the main enlarged member to the camshaft side is provided integrally on the main enlarged member.

The present invention according to a fifth aspect thereof, in addition to the fourth aspect, is characterized in that the second enlarged member is formed so as to be extended towards the camshaft until the second enlarged member coincides with a locus of rotation of a greater diameter from between loci of rotation of outer peripheries of the pair of cams as viewed from an axial direction of the camshaft.

The present invention according to a sixth aspect thereof, in addition to the third aspect, is characterized in that a reinforcing bridge disposed between the camshaft and the enlarged member is provided integrally on the connecting portion in such a manner that the extending portion is disposed on the opposite sides of the reinforcing bridge.

The present invention according to a seventh aspect thereof, in addition to one of the first through sixth aspects, is characterized in that a plurality of reed valve chambers individually corresponding to a plurality of reed valves disposed in an adjacent relationship to each other on the head cover are formed in a mutually adjacent relationship in the main enlarged member.

It may be noted that the exhaust side valve motion chamber 26E in the embodiment corresponds to the valve motion chamber in the present invention, the exhaust side valve motion apparatus 39E in the embodiment corresponds to the valve motion apparatus in the present invention, the exhaust side cam cap 41E in the embodiment corresponds to the cam cap in the present invention, the exhaust side camshaft 42E in the embodiment corresponds to the camshaft in the present invention, and the exhaust side cam 170 in the embodiment corresponds to the cam in the present invention.

Effects of the Invention

According to the first aspect of the present invention, since the recessed portion in which a portion of the main enlarged member provided on the head cover for forming the reed valve chamber is provided on the cam cap fastened to the cylinder head, the extended amount of the main enlarged member towards the camshaft side can be increased while avoiding interference of the camshaft with the cam, and also avoiding interference of the camshaft with the cam cap. Also, a desired volume of the reed valve chamber can be assured without extending (swelling) the main enlarged member outwardly of the head cover.

According to the second characteristic of the present invention, since the cam cap has the pair of bearing portions for rotatably supporting the camshaft together with the cylinder head and the connecting portion integrated with the bearing portions for connecting both of the bearing portions to each other, and the recessed portion is provided on the connecting portion, it can be avoided that the supporting strength of the camshaft by the cam cap is dropped by provision of the recessed portion.

According to the third aspect of the present invention, since a portion of the main enlarged member is disposed on the extending portion provided on the connecting portion, it is possible to position the main enlarged members nearer to the camshaft side while avoiding interference with the cam cap, and reduction in weight by the main enlarged member can be anticipated within a range within which the strength of the cam cap does not drop.

According to the fourth aspect of the present invention, since the second enlarged member which is disposed between the pair of cams provided on the camshaft is further extended from the main enlarged member towards the camshaft, the volume of the reed valve chamber can be further increased while avoiding interference with the cam.

According to the fifth aspect of the present invention, since the second enlarged member is extended towards the camshaft until the second enlarged member coincides with the locus of rotation of a greater diameter from between the loci of rotation of the outer peripheries of the cams as viewed from the axial direction of the camshaft, the second enlarged member can be positioned more closely towards the camshaft for assuring desired volume of the reed valve chamber.

According to the sixth aspect of the present invention, since the reinforcing bridge disposed between the camshaft and the main enlarged member is provided integrally on the connecting portion in such a manner that the extending portion is disposed on the opposite sides of the reinforcing bridge, the connecting portion of the cam cap can be reinforced not to influence on the main enlarged member.

Further, according to the seventh aspect of the present invention, since the plural reed valve chambers disposed in an adjacent relationship to each other are formed in the main enlarged member, compact arrangement of the reed valves and the reed valve chambers can be anticipated.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Further, it should be noted that where a reference number is followed herein by multiple dots such as . . . , that is a short way of indicating that more than one of that referenced component is present in the assembled structure.

In the following, an embodiment of the present invention is described based on working examples of the present invention shown in the accompanying drawings.

Illustrative Embodiment 1

An illustrative embodiment (working example) 1 of the present invention is described with reference to FIGS. 1 to 17.

Figure 1:
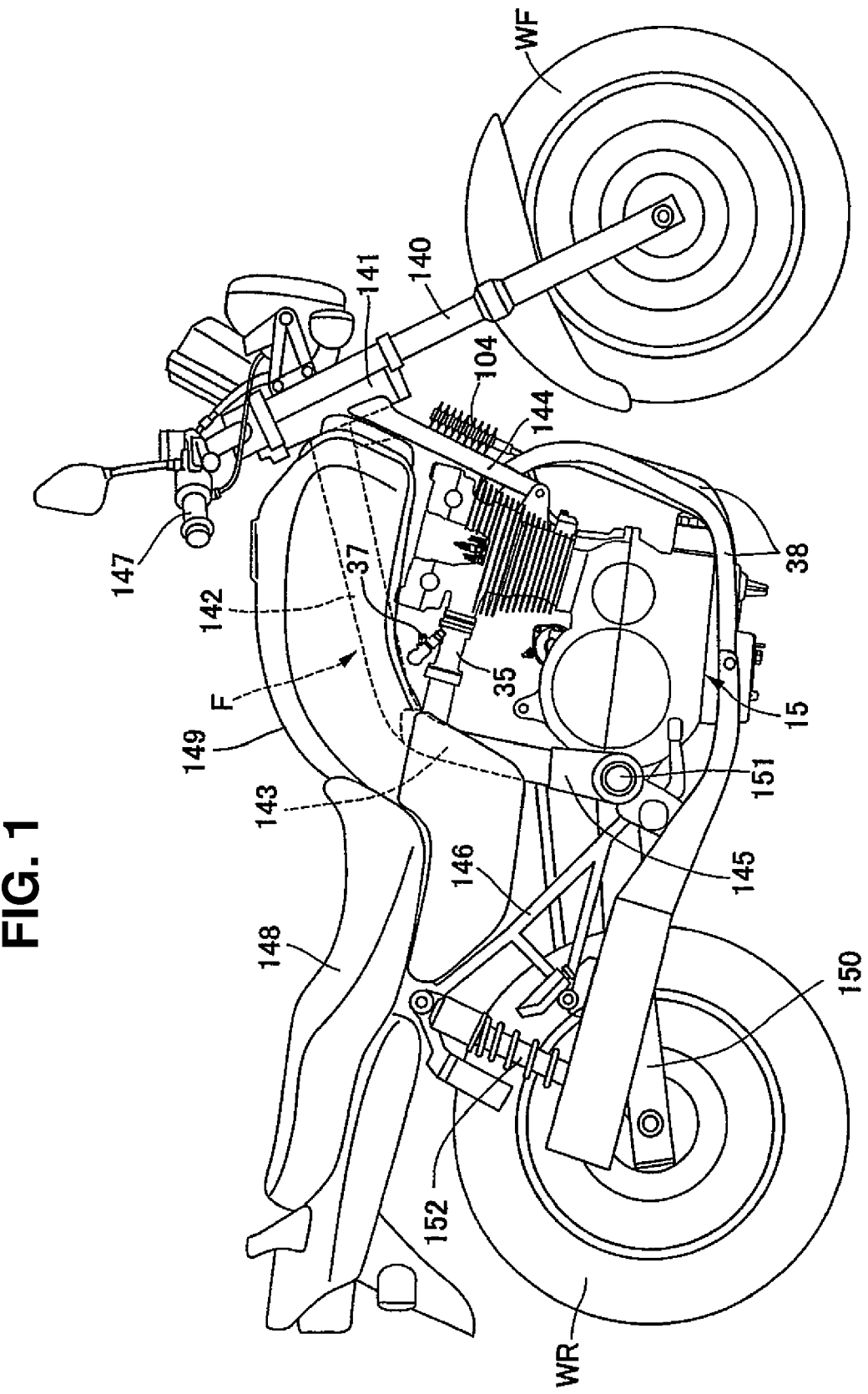
FIG. 1 is a right side elevational view of a motorcycle according an illustrative embodiment of the present invention.

As shown in FIG. 1, a motorcycle according to the present invention includes a vehicle body frame F. The vehicle body frame F includes a head pipe 141 for supporting a front fork 140, a main frame 142 extending rearwardly from the head pipe 141, a pair of left and right center tubes 143 . . . extending downwardly from a rear end of the main frame 142, a pair of left and right down tubes 144 . . . inclined rearwardly downward at a steeper angle than the main frame 142 from the head pipe 141, a pair of left and right pivot plates 145 . . . individually provided at lower end portions of the center tubes 143, . . . , and a pair of left and right seat rails 146 . . . extending rearwardly from the pivot plates 145, . . . . The front fork 140 has a front wheel WF supported at a lower end thereof for steering operation.

A steering handle member 147 is connected to an upper end of the front fork 140. A rider's seat 148 is arranged on the seat rails 146, . . . . A fuel tank 149 extending across the main frame 142 forwardly of the rider's seat 148 is supported by the main frame 142.

An engine body 15 of a four-cycle in-line multi-cylinder air-oil cooled internal combustion engine is supported by the down tubes 144 . . . and the pivot plates 145, . . . at a location surrounded by the main frame 142, center tubes 143 . . . and down tubes 144 . . . .

Further, swing arms 150 . . . having rear end portions at which a rear wheel WR which is driven by the internal combustion engine, is supported for rotation at front end portions thereof on the pivot plates 145 for rocking motion on the pivot plates 145 . . . through a support shaft 151. Rear shock absorbers 152 . . . are provided between the seat rails 146 . . . and the swing arms 150, . . . .

Figure 2:
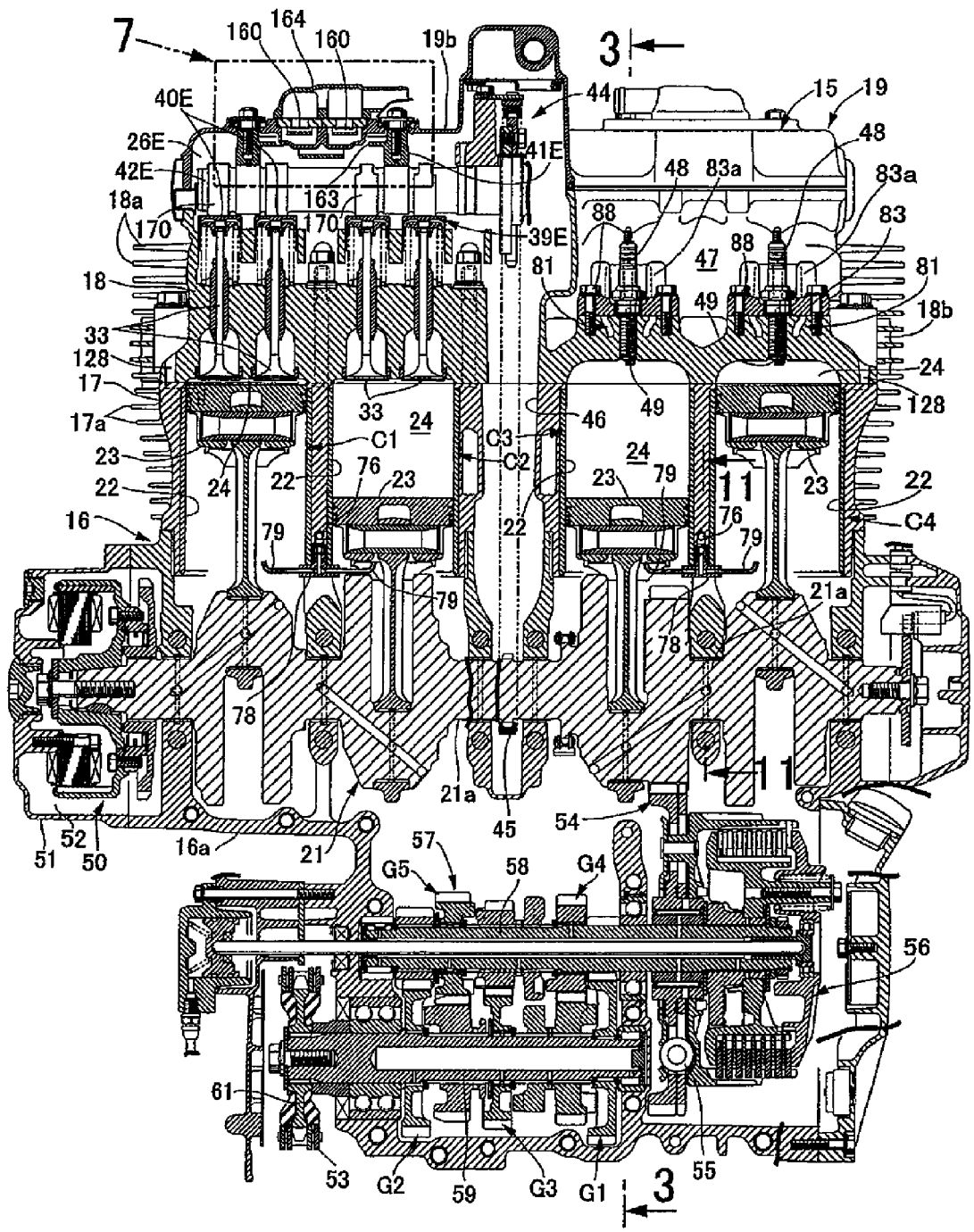
FIG. 2 is a vertical sectional view of a four-cycle air-oil cooled internal combustion engine taken along line 2-2 of FIG. 3.
Figure 3:
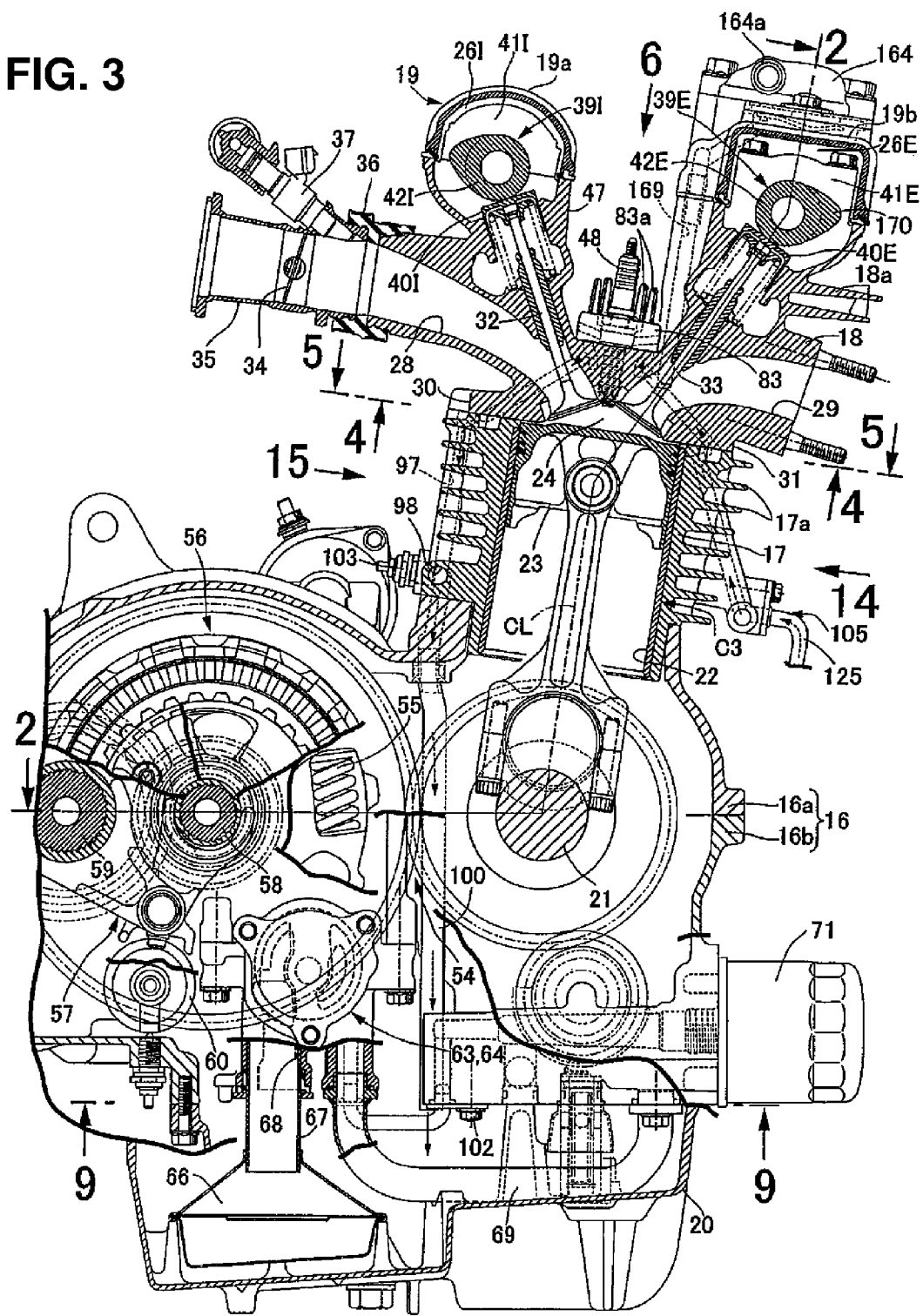
FIG. 3 is a view taken along line 3-3 of FIG. 2.

Referring to FIGS. 2 and 3, the engine body 15 includes a crankcase 16, a cylinder block 17, a cylinder head 18 and a head cover 19. A plurality of cylinder block side cooling fins 17a, 17a . . . spaced from each other in a direction along a cylinder axial line CL are formed integrally in a projecting manner on a side face of the cylinder block 17. A plurality of cylinder head side cooling fins 18a, 18a . . . spaced from each other in a direction along the cylinder axial line CL are provided integrally in a projecting manner on a side face of the cylinder head 18.

An oil pan 20 is coupled to and arranged at the bottom of the engine body 15, that is, attached to the bottom of the crankcase 16. Further, the crankcase 16 is formed from an upper case half 16a and a lower case half 16b coupled to each other. A crankshaft 21 is supported for rotation between the upper and lower case halves 16a and 16b.

Figure 4:
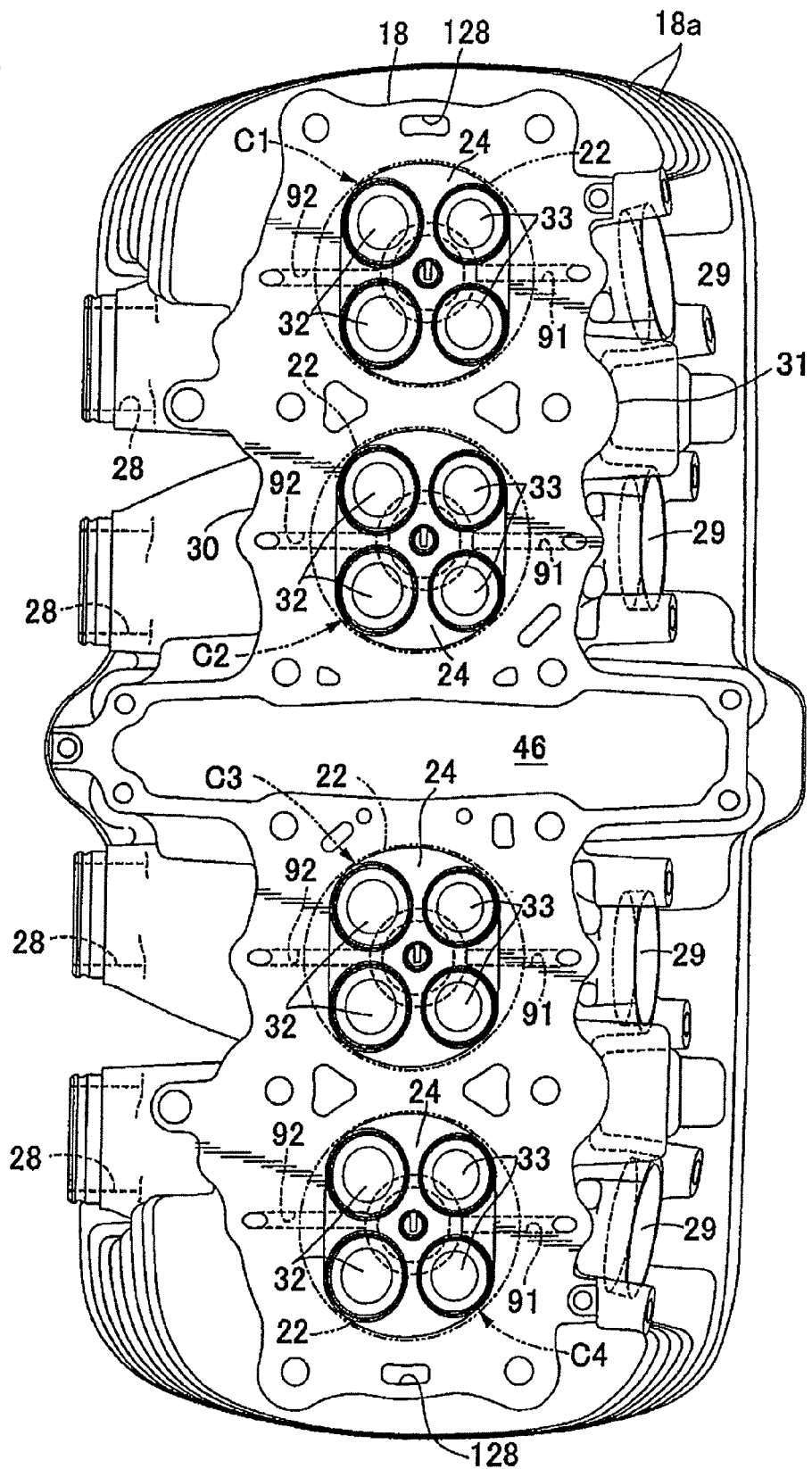
FIG. 4 is a view taken along line 4-4 of FIG. 3.
Figure 5:
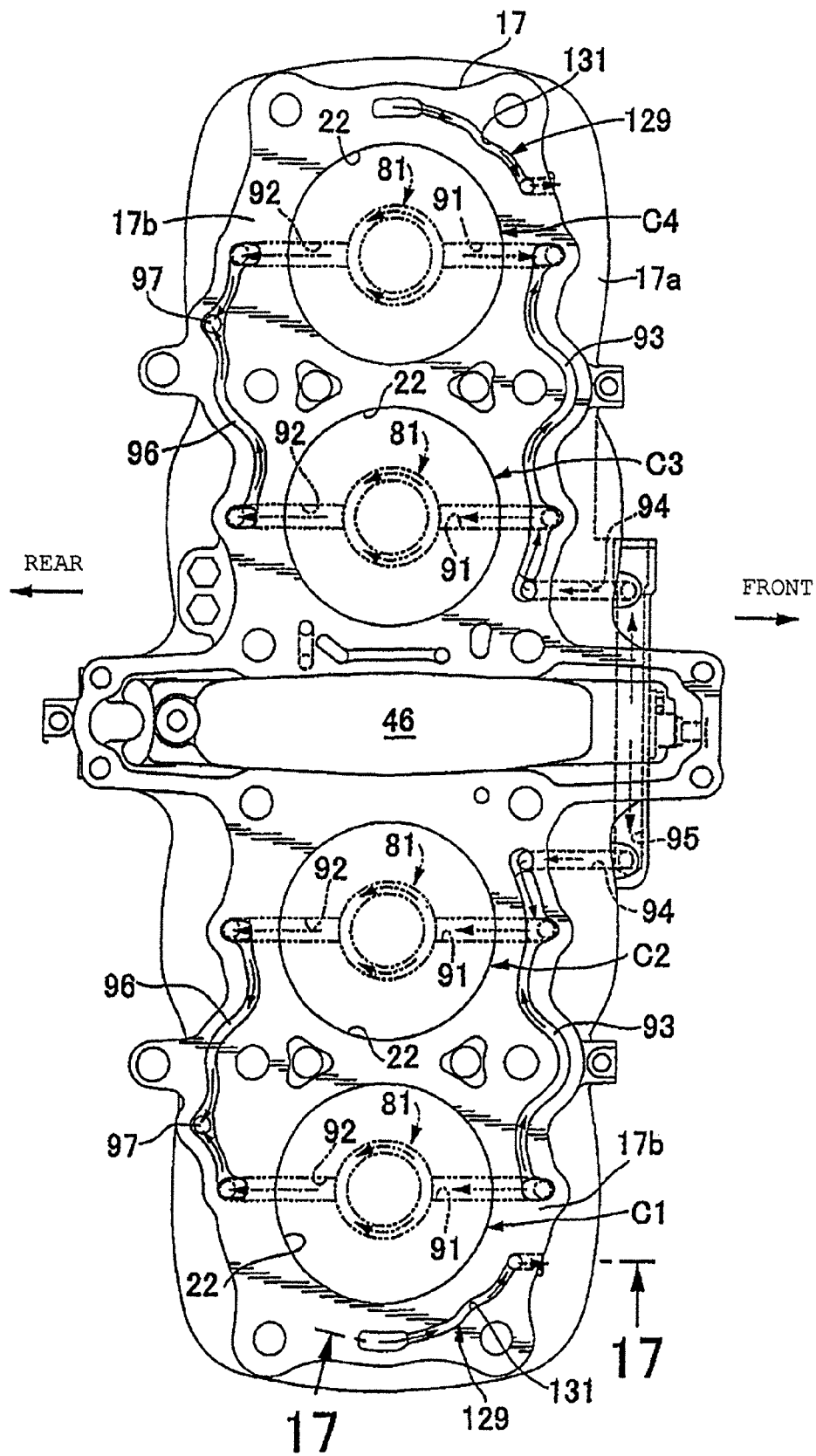
FIG. 5 is a view taken along line 5-5 of FIG. 3.

Referring also to FIGS. 4 and 5, the engine body 15 includes first to fourth cylinders C1 to C4 juxtaposed in parallel to the axial line of the crankshaft 21. Pistons 23 . . . fitted for sliding movement in cylinder bores 22, 22 . . . provided in the cylinder block 17 for the individual cylinders C1 to C4 are connected commonly to the crankshaft 21, and combustion chambers 24 . . . in which top portions of the pistons 23 . . . are opposed are formed between the cylinder block 17 and the cylinder head 18 for the individual cylinders C1 to C4. The cylinder block 17 is coupled to the crankcase 16 such that the axial line of each of the cylinder bores 22, 22, . . . , that is, the cylinder axial line CL, is inclined forwardly.

Intake ports 28 . . . formed in a bifurcated form are provided for the individual cylinders C1 to C4 in the cylinder head 18 such that they are opened to a rear face 30 of the cylinder head 18. Exhaust ports 29 formed in a bifurcated form are provided for the individual cylinders C1 to C4 in the cylinder head 18 such that they are opened to a front face 31 of the cylinder head 18.

The opening ends of the intake ports 28 . . . to the combustion chambers 24 . . . are operated (opened and closed) by intake valves 32 . . . which are disposed for opening and closing movement in the cylinder head 18 and biased in a valve closing direction by springs. Opening ends of the exhaust ports 29 to the combustion chambers 24 . . . are operated (opened and closed) with exhaust valves 33 . . . which are disposed for opening and closing movement in the cylinder head 18 and biased in a valve closing direction by springs.

Throttle bodies 35 . . . having throttle valves 34 . . . are connected to the individual intake ports 28 . . . through insulators 36, . . . , and fuel injection valves 37 . . . for injecting fuel toward the intake ports 28 . . . are provided for the throttle bodies 35, . . . . Further, exhaust pipes 38 . . . are individually connected to the exhaust ports 29 (see FIG. 1). The exhaust pipes 38 . . . are curved downwardly from the front face 31 of the cylinder head 18, so as to pass below the engine body 15 and extend rearwardly.

Figure 6:
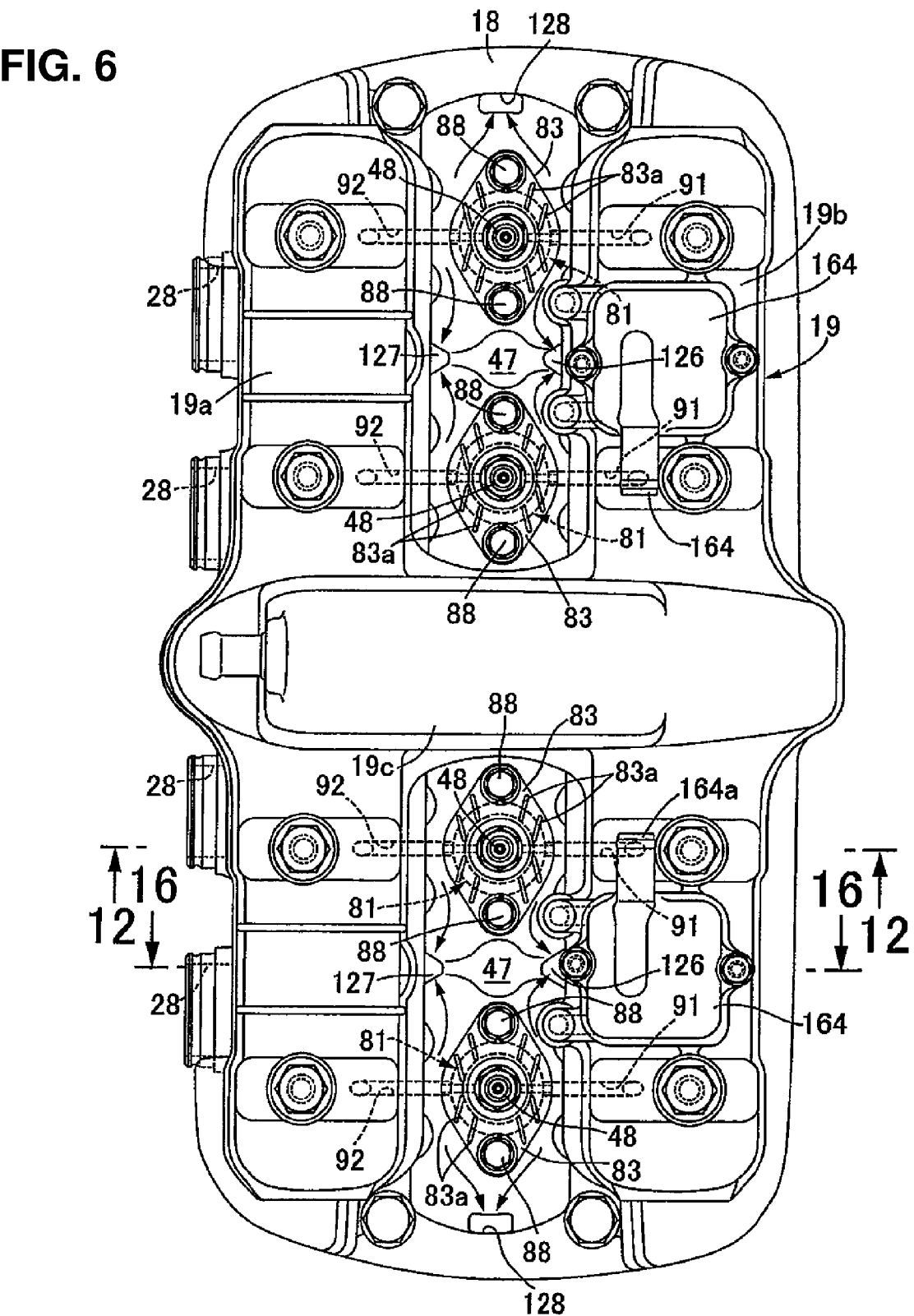
FIG. 6 is a plan view as viewed in the direction indicated by an arrow 6 in FIG. 3.

Referring also to FIG. 6, the head cover 19 includes a rear box-like portion 19a coupled to an upper portion of the cylinder head 18 to form an intake side valve motion chamber 26I together with the cylinder head 18, a front box-like portion 19b coupled to an upper portion of the cylinder head 18 to form an exhaust side valve motion chamber 26E together with the cylinder head 18, and a connecting portion 19c for connecting the rear box-like portion 19a and the front box-like portion 19b integrally to each other. The head cover 19 is formed in a substantially H shaped profile.

An intake side valve motion apparatus 39I for operating (driving open and close) the intake valves 32 . . . includes lifters 40I . . . of a bottom cylindrical shape accommodated in the intake side valve motion chamber 26I formed between the cylinder head 18 and the head cover 19 for being contacted by stem ends at upper ends of the intake valves 32 . . . and being fitted for sliding movement in the cylinder head 18, and an intake side camshaft 42I extending in parallel to the crankshaft 21 commonly to the cylinders and supported for rotation between the cylinder head 18 and a plurality of cam caps 41I . . . fastened to the cylinder head 18. The lifters 40I . . . are slidably moved upwardly and downwardly in response to rotation of the intake side camshaft 42I to open and close the intake valves 32, . . . .

An exhaust side valve motion apparatus 39E for operating (driving open and close) the exhaust valves 33 . . . includes lifters 40E . . . of a bottomed cylindrical shape accommodated in the exhaust side valve motion chamber 26E formed between the cylinder head 18 and the head cover 19 for being contacted by stem ends at upper ends of the exhaust valves 33 . . . and being fitted for sliding movement in the cylinder head 18, and an exhaust side camshaft 42E extending in parallel to the crankshaft 21 commonly to the cylinders and supported for rotation between the cylinder head 18 and a plurality of exhaust side cam caps 41E . . . fastened to the cylinder head 18. The lifters 40E . . . are slidably moved upwardly and downwardly in response to rotation of the exhaust side camshaft 42E to open and close the exhaust valves 33, . . . .

A timing driving mechanism 44 is provided between the intake side camshaft 42I and exhaust side camshaft 42E and the crankshaft 21 (see FIG. 2). The timing driving mechanism 44 transmits rotational power of the crankshaft 21 to the intake side camshaft 42I and the exhaust side camshaft 42E at a speed reducing ratio of 1/2. A cam chain path 46 is provided over the crankcase 16, cylinder block 17 and cylinder head 18 at a central location along the direction in which the cylinders are juxtaposed. The cam chain path 46 allows a cam chain 45, which forms part of the timing driving mechanism 44, to travel therealong.

Incidentally, an upper portion of the cylinder head 18 is formed such that a pair of plug attachment recessed portions 47 . . . are, in a state wherein the engine body 15 is carried on the motorcycle, open leftwardly and upwardly and open rightwardly and upwardly, respectively. The cam chain path 46 is positioned between the pair of plug attachment recessed portions 47, . . . .

While ignition plugs 48 . . . having end portions opposed to central portions of the combustion chambers 24 . . . are attached to the cylinder head 18, plug attachment holes 49 . . . for attaching the ignition plugs 48 . . . are provided on bottom portions of the plug attachment recessed portions 47 . . . at central locations of the combustion chambers 24, . . . .

Figure 7:
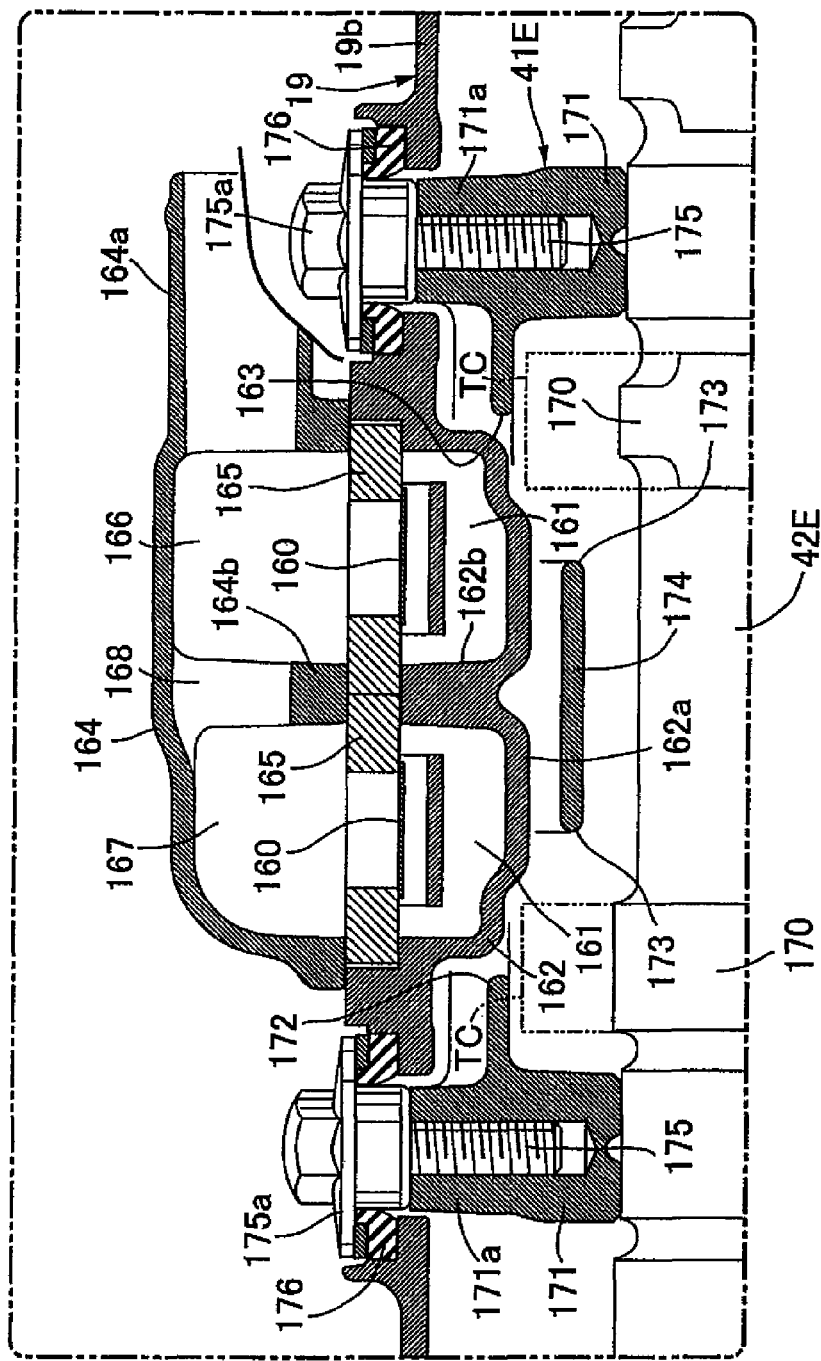
FIG. 7 is an enlarged view as viewed in the direction indicated by an arrow 7 in FIG. 2.

Referring also to FIG. 7, reed valves 160, 160 . . . for controlling supply of secondary air to the exhaust system of the internal combustion engine are disposed for the individual cylinders C1 to C4 in the front side box-like portion 19b of the head cover 19. At the front box-like portion 19b of the head cover 19 at a location at which the reed valves 160 . . . are disposed, enlarged members 162 . . . which are extended to the exhaust side camshaft side in such a manner as to form reed valve chambers 161 . . . for accommodating the reed valves 160 . . . are provided integrally. A recessed portion 163 in which part of the enlarged members 162 . . . are fitted is provided on an exhaust side cam cap 41E. The exhaust cap 41E is fastened to the cylinder head 18 in such a manner as to cooperate with the cylinder head 18 for rotatably supporting the exhaust side camshaft 42E.

The reed valves 160 are disposed for the individual cylinders C1 to C4. In the present working example 1, reed valves 160, 160 for two cylinders are disposed adjacent to each other. Two enlarged members 162 . . . which form a pair of reed valve chambers 161, 161 . . . for individually accommodating two sets of pairs of reed valves 160, 160 . . . are positioned adjacent to each other. A pair of housings 164 . . . integrally having connecting pipes 164a . . . to which conduits for introducing secondary air from an air cleaner (not shown) are connected to an outer face of the front box-like portion 19b, in such a manner as to cover a portion of the front box-like portion 19b of the head cover 19 at which the enlarged members 162 . . . are formed.

Each reed valve 160 is attached to a ring shaped support member 165. The support members 165 for one pair of reed valves 160 . . . are sandwiched between the front box-like portion 19b of the head cover 19 and a housing 164. Further, a barrier 164b for partitioning the housing 164 into a pair of air introduction chambers 166 and 167 individually corresponding to a pair of reed valves 160 . . . is provided integrally on the housing 164. A communicating hole 168 for communicating the air introduction chambers 166 and 167 with each other is formed in the barrier 164b. Further, a barrier 162b for forming a pair of reed valve chambers 161 . . . individually corresponding to a pair of reed valves 160 . . . positioned adjacent each other in an adjacent relationship to each other in a main enlarged member 162 is provided integrally on the main enlarged member 162.

As shown in FIG. 3, a plurality of secondary air paths 169 . . . communicating at one end thereof with the reed valve chambers 161 . . . are provided in the head cover 19 and the cylinder head 18 The secondary air paths 169 . . . are open at the other end thereof to the exhaust ports 29 . . . of the cylinders C1 to C4.

Figure 8:
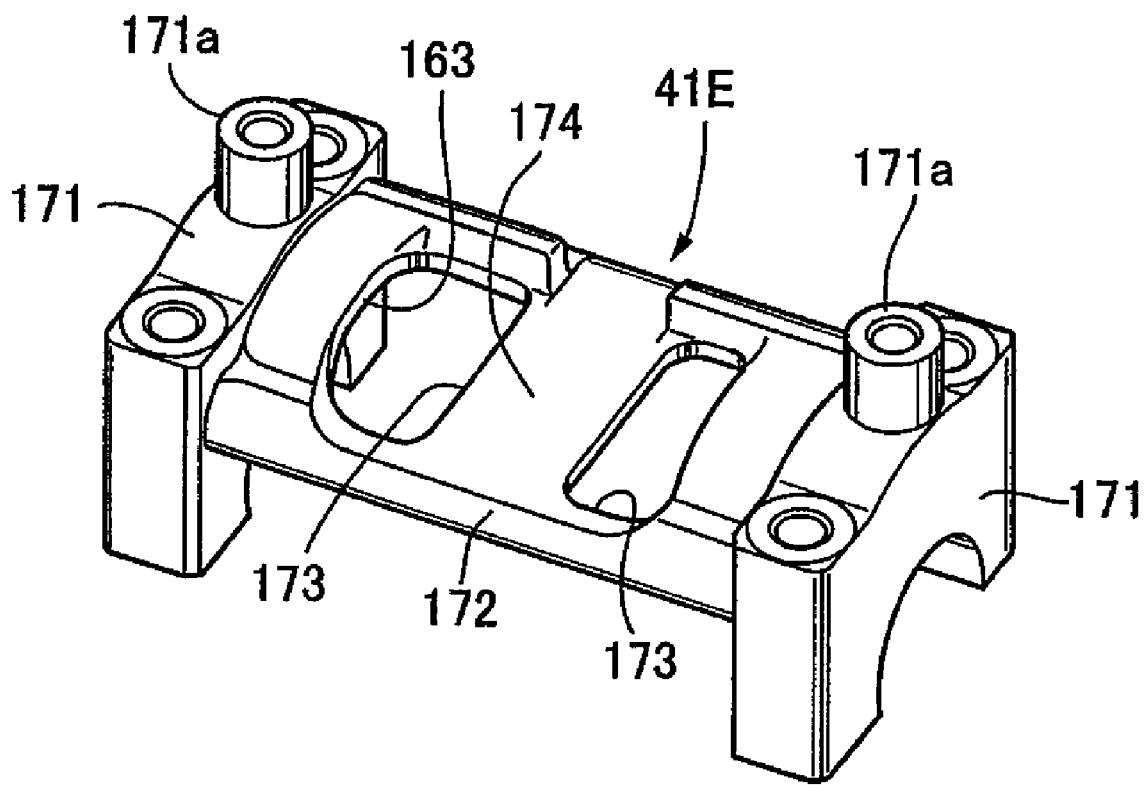
FIG. 8 is a perspective view of a cam cap.

Referring also to FIG. 8, the exhaust side cam cap 41E integrally has thereon a pair of bearing portions 171, 171 which sandwich therebetween two exhaust side cams 170, 170. The exhaust side cams 170, 170 are provided on the exhaust side camshaft 42E individually corresponding to the two exhaust valves 33, 33 positioned adjacent each other from among the exhaust valves 33 . . . of a plurality of exhaust side cams provided on the exhaust side camshaft 42E. For example, of two ones of the first to fourth cylinders C1 to C4 and support the exhaust side camshaft 42E for rotation together with the cylinder head 18, and a connecting portion 172 for connecting the two bearing portions 171, 171 to each other. The recessed portion 163 is provided on the connecting portion 172.

Besides, a second main enlarged member 162a . . . is further extended from each main enlarged member 162 toward the exhaust side camshaft 42E side is provided integrally on the main enlarged member 162. The second main enlarged member 162a . . . is disposed between a pair of exhaust side cams 170, 170 provided on the exhaust side camshaft 42E and is further extended from each main enlarged member 162 toward the exhaust side camshaft 42E side is provided integrally on the main enlarged member 162. The second main enlarged member 162a is formed so as to be extended to the exhaust side camshaft 42E side until it coincides with a locus of rotation of a greater diameter from between loci C of rotation of outer circumferences of a pair of exhaust side cams 170, 170 as viewed from the axial direction of the exhaust side camshaft 42E. In the present working example 1, with the locus TC of rotation of the outer circumference of both exhaust side cams 170, 170 because the loci C of rotation of the outer circumferences of both exhaust side cams 170, 170 have an equal diameter.

In addition, the extending portions 173, 173 are provided on the connecting portion 172, in a manner such that part of the enlarged members 162 . . . is disposed therein and a reinforcing bridge 174 which is disposed between the exhaust side camshaft 42E and the main enlarged member 162 is provided integrally such that the extending portions 173, 173 are disposed on the opposite sides of the reinforcing bridge 174.

On the bearing portions 171 . . . of the exhaust side cam cap 41E, cylindrical attachment bosses 171a, 171a which extend through the front box-like portion 19b of the head cover 19 are provided integrally on the bearing portions 171 . . . of the exhaust side cam cap 41E, and bolts 175 . . . are screwed in the attachment bosses 171a, 171a. Annular resilient members 1786 . . . are sandwiched between increased diameter head portions 175a . . . of the bolts 175 . . . and the front box-like portion 19b of the head cover 19 to attach the head cover 19 to the cylinder head 18 side.

As shown in FIG. 2, a generator 50 is connected to one end of the crankshaft 21. The generator 50 is accommodated in a generator chamber 52 formed between a side cover 51 coupled to the crankcase 16 and the crankcase 16. Rotary power of the crankshaft 21 is transmitted through an endless chain 53 to the rear wheel WR of the motorcycle. The rotary power of the crankshaft 21 is transmitted to the chain 53 through a primary reduction gear 54, a damper spring 55, a starting clutch 56 and a gear transmission 57.

The gear transmission 57 includes a main shaft 58 to which rotary power of the crankshaft 21 is inputted through the primary reduction gear 54, damper spring 55 and starting clutch 56, a countershaft 59 having an axial line parallel to the main shaft 58 and having a projecting portion which projects from the crankcase 16 and to which a driving sprocket wheel 61 around which the chain 53 is wrapped is secured, gear wheel trains of a plurality of speed change stages. For example, first to fifth speed gears G1, G2, G3, G4 and G5 are provided between the main shaft 58 and the countershaft 59 for allowing selective establishment, and a shift drum 60 (refer to FIG. 3) rotatable around an axial line parallel to the main shaft 58 and the countershaft 59 are provided for allowing selective establishment of the first to fifth speed gears G1 to G5 in response to rotational operation thereof. The gear transmission 57 is disposed in the crankcase 16. Besides, the main shaft 58 and the countershaft 59 are supported for rotation between the upper and lower case halves 16a and 16b which form the crankcase 16.

Figure 9:
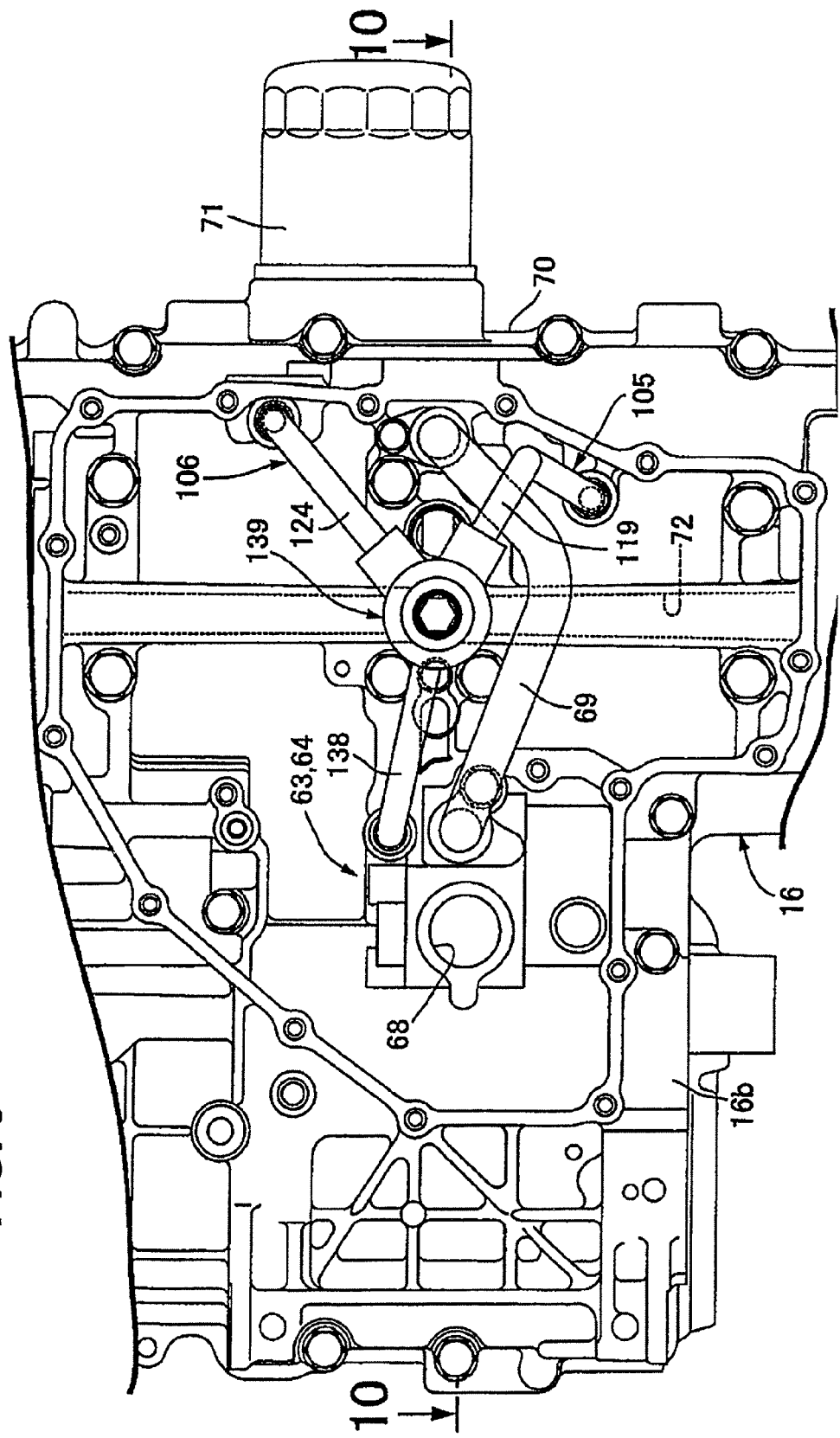
FIG. 9 is a view of a crankcase, with an oil strainer removed, as viewed in the direction indicated by arrows 9-9 of FIG. 3.
Figure 10:
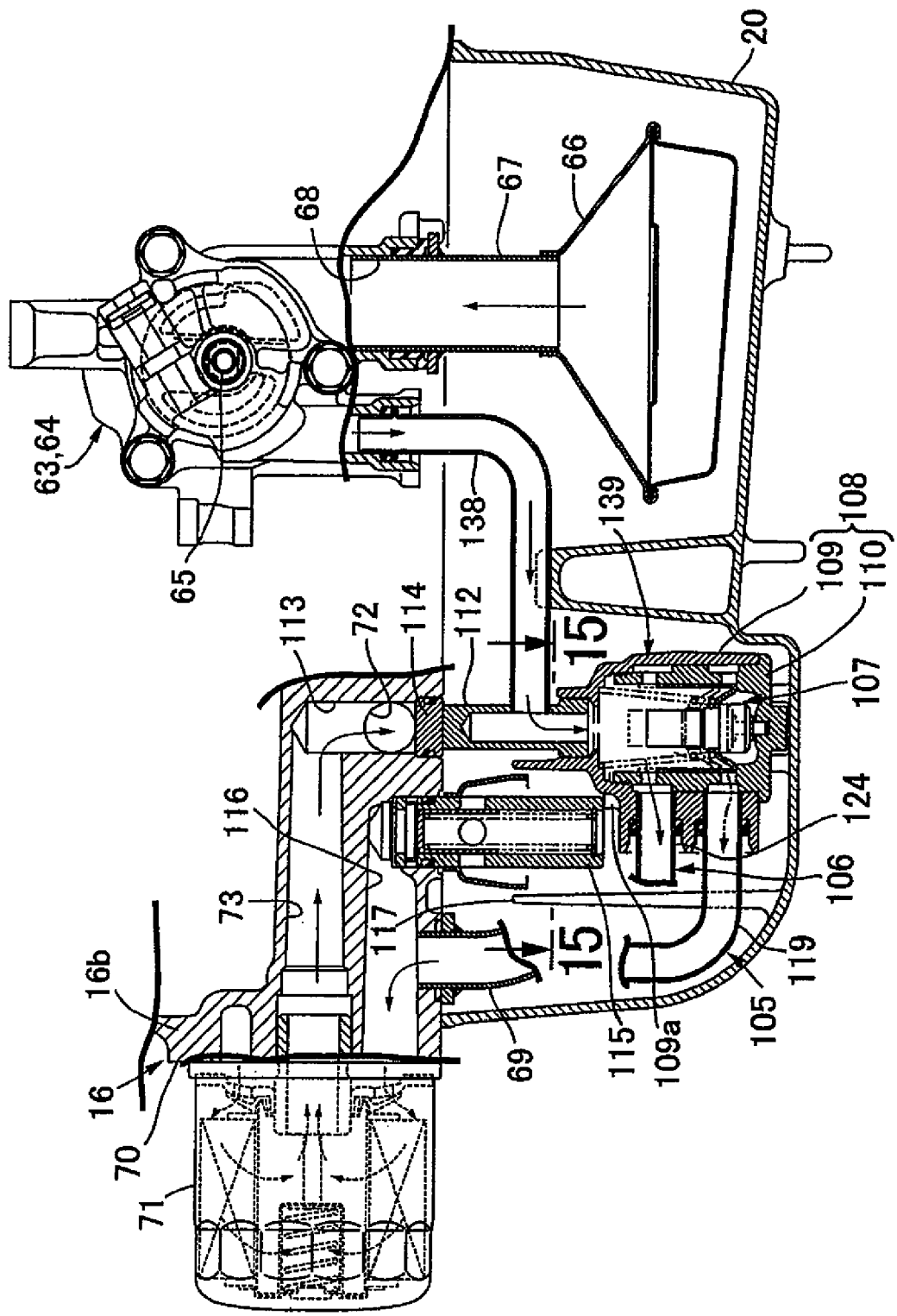
FIG. 10 is a sectional view taken along line 10-10 of FIG. 9, and showing part of an oil path structure in a crankcase and an oil pan.

Referring also to FIGS. 9 and 10, a cooling oil pump 63 and a lubricating oil pump 64 have a common pump shaft 65 such that they are formed as a unit and are disposed on the bottom of the crankcase 16. Further, an oil strainer 66 is accommodated in the oil pan 20 coupled to the bottom of the crankcase 16, and an upper portion of an oil intake pipe 67 which extends upwardly from the oil strainer 66 is fitted in from below and secured to an intake path 68 which is provided commonly in the cooling oil pump 63 and the lubricating oil pump 64. The cooling oil pump 63 and the lubricating oil pump 64 pump up oil from the oil pan 20 through the oil strainer 66, and power is transmitted from the crankshaft 21 to the pump shaft 65.

A lubricating discharge pipe 69 connecting to the lubricating oil pump 64 is curved in the oil pan 20 and extends forwardly (rightwardly in FIG. 9 and leftwardly in FIG. 10), and is connected to an oil filter 71 attached to a front wall 70 from among side walls of the crankcase 16 which is opposed forwardly in a state wherein the engine body 15 is carried on the motorcycle. Further, a main gallery 72 is provided on the lower case half 16b of the crankcase 16, and an oil filter exit path 73 which extends from a central portion of the oil filter 71 is communicated with the main gallery 72.

Figure 11:
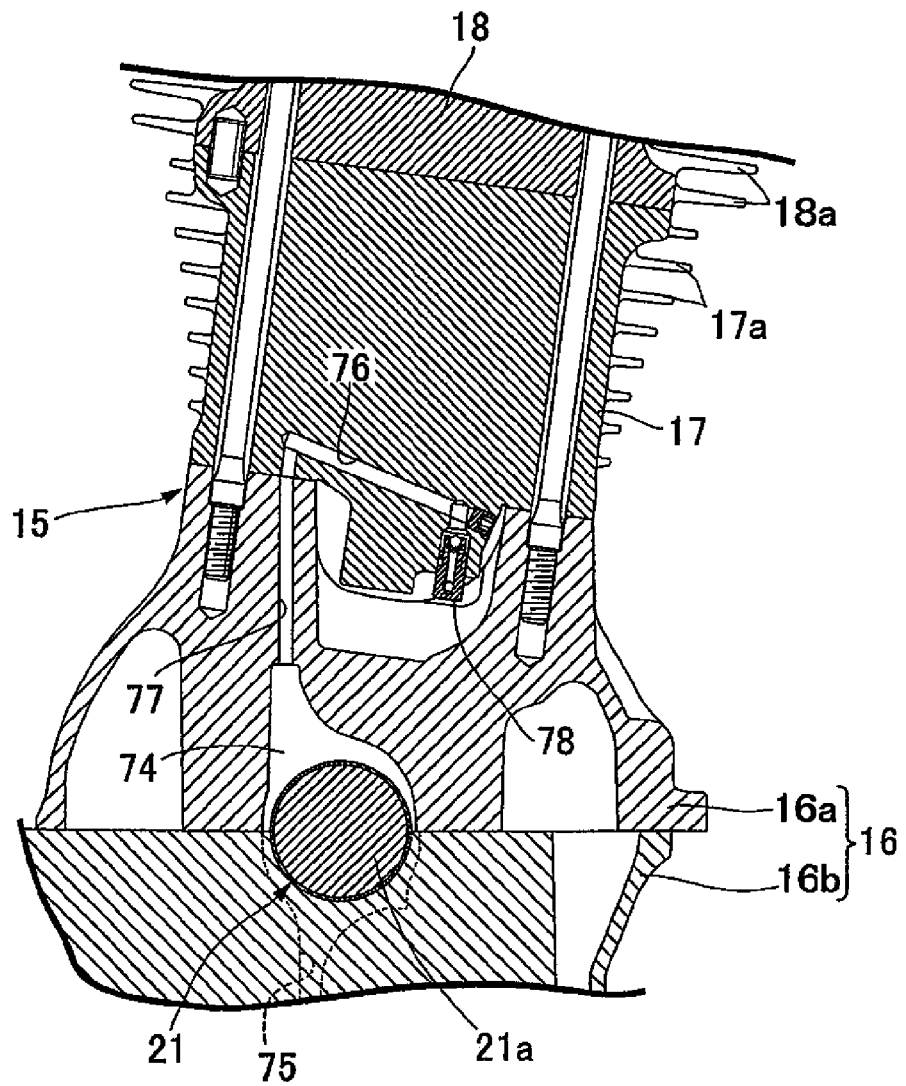
FIG. 11 is an enlarged sectional view taken along line 11-11 of FIG. 2.

Referring also to FIG. 11, journal portions 21a . . . for being supported for rotation between the upper and lower case halves 16a and 16b of the crankcase 16 are provided on the crankshaft 21 between adjacent ones of the cylinders C1 to C4. Annular lubrication chambers 74 . . . are formed between the journal portions 21a . . . and the upper and lower case halves 16a and 16b of the crankcase 16, and oil paths 75 . . . which are branched from the main gallery 72 and directed to the plural lubrication chambers 74 . . . are provided in the lower case half 16b.

An oil jet path 76 is provided in the cylinder block 17 between the first and second cylinders C1 and C2 and between the third and fourth cylinders C3 and C4 . . . as shown in FIG. 2. Oil from the lubrication chambers 74 . . . is introduced to the oil jet paths 76 . . . through oil paths 77 . . . provided in the upper case half 16a.

Besides, substantially T-shaped distribution pipes 78 . . . are connected to the oil jet paths 76, . . . , and injection nozzles 79, 79 for injecting oil toward the pistons 23 . . . of the first and second cylinders C1 and C2 are attached to the distribution pipe 78 connected to the oil jet path 76 between the first and second cylinders C1 and C2 while injection nozzles 79, 79 for injecting oil toward the pistons 23 . . . of the third and fourth cylinders C3 and C4 are attached to the distribution pipe 78 connected to the oil jet path 76 between the third and fourth cylinders C3 and C4.

Further, oil from the main gallery 72 is supplied for lubrication to the intake side valve motion apparatus 39I and the exhaust side valve motion apparatus 39E through oil paths (not shown) provided in the cylinder block 17 and the cylinder head 18.

Figure 12:
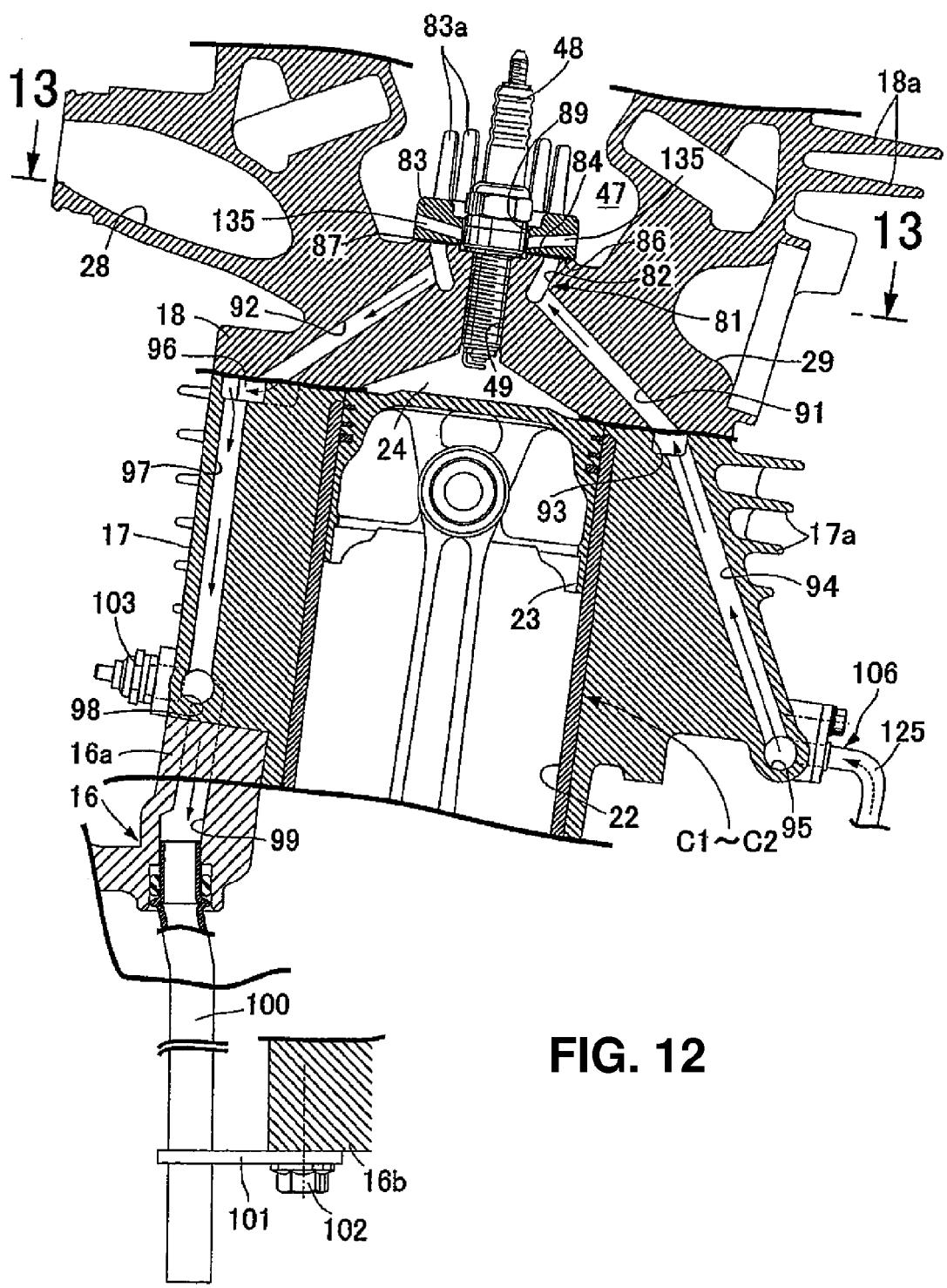
FIG. 12 is a sectional view taken along line 12-12 of FIG. 6, and showing an oil jacket and a path leading to the oil jacket.
Figure 13:
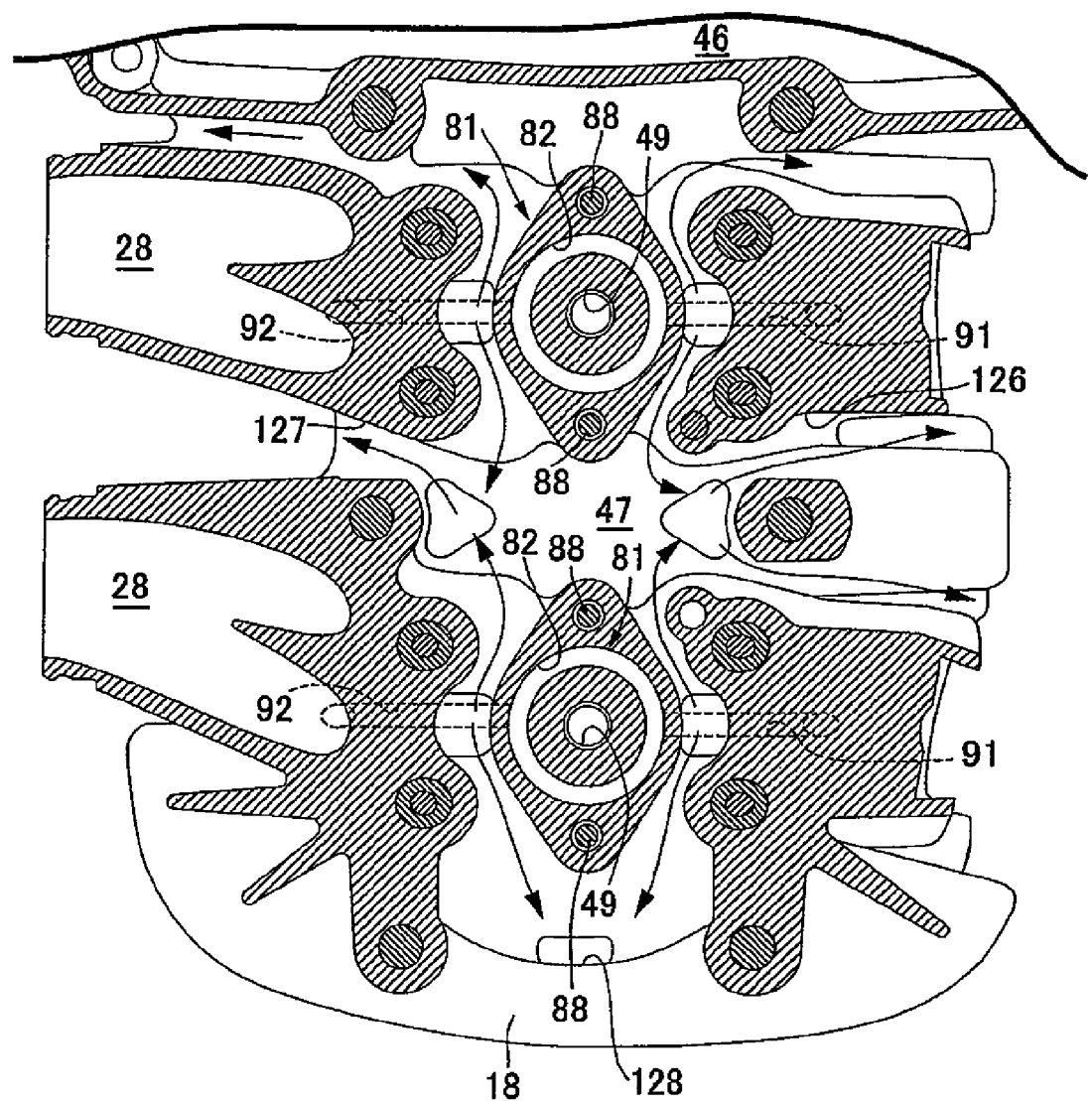
FIG. 13 is a sectional view taken along line 13-13 of FIG. 12.

Referring to FIGS. 12 and 13, oil jackets 81 . . . for communicating oil pressure fed from the cooling oil pump 63 are formed for the individual cylinders C1 to C4 in such a manner as to surround the plug attachment holes 49, . . . . Each oil jacket 81 is formed such that an opening end of a ring-shaped groove 82 provided on the cylinder head 18 in such a manner as to surround a plug attachment hole 49 is formed in a ring surrounding an ignition plug 48 and is closed up with a lid member 83 serving as a fixed member fastened to the cylinder head 18. A plurality of cooling fins 83a, 83a is formed integrally on the lid member 83.

Flat seal faces 84 disposed in a plane perpendicular to the axial line of the plug attachment hole 49 and connecting in an endless fashion to each other in so as to sandwich the opening end of the groove 82 from the inner side and the outer side on the cylinder head 18. The lid member 83 having a flat face 86 opposing to the seal face 84 is fastened to the cylinder head 18 by a pair of bolts 88, 88 spaced from each other in the cylinder arrangement direction as seen in FIGS. 6 and 13 such that a seal member 87 is interposed between the seal faces 84 . . . and the flat faces 86. The ignition plug 48 is inserted in a plug insertion hole 89 provided at a central portion of the lid member 83 and is screwed in a plug attachment hole 49 of the cylinder head 18.

Further, on the cylinder head 18, introduction side oil paths 91 . . . for introducing oil from the exhaust ports 29 . . . side to the oil jackets 81 . . . of the cylinders C1 to C4 and derivation side oil paths 92 . . . for deriving oil from the oil jackets 81 . . . of the cylinders C1 to C4 to the intake ports 28 side are provided. The introduction side oil paths 91 . . . and the derivation side oil paths 92 . . . are disposed on a plane which extends perpendicularly to the cylinder arrangement direction and passes the cylinder axial line CL.

Figure 14:
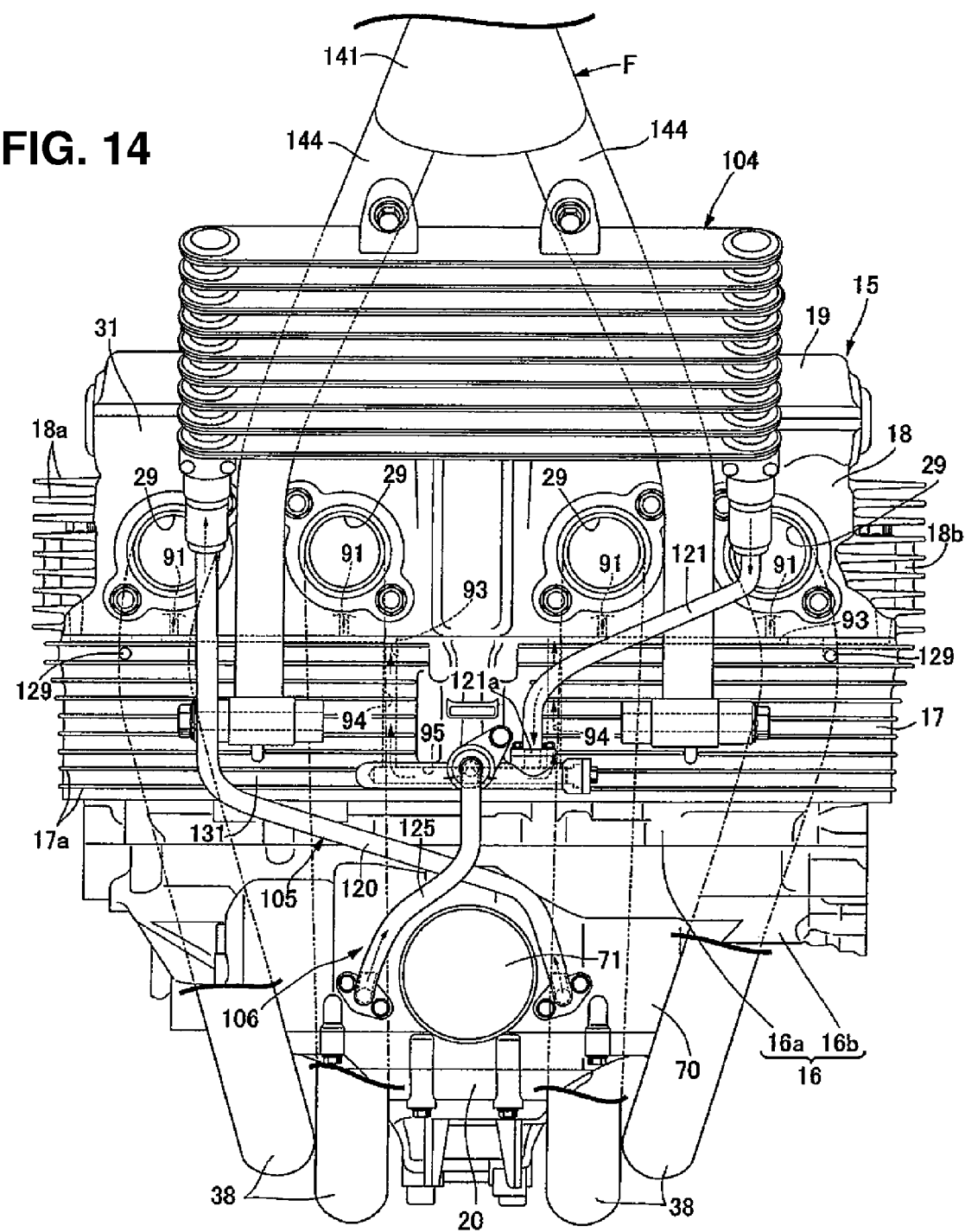
FIG. 14 is a front elevational view of an engine body mounted on a vehicle body frame as viewed in the direction indicated by an arrow 14 of FIG. 3.

Referring also to FIG. 14, the introduction side oil paths 91 . . . of the first and second cylinders C1 and C2 are communicated with a introduction side first common path 93 formed between the cylinder block 17 and the cylinder head 18 at locations corresponding to the first and second cylinders C1 and C2. The introduction side oil paths 91 . . . of the third and fourth cylinders C3 and C4 . . . are communicated with the introduction side first common path 93 formed between the cylinder block 17 and the cylinder head 18 at locations corresponding to the third and fourth cylinders C3 and C4, . . . .

Further, a pair of paths 94, 94 extending upwardly and downwardly and individually communicating at one end thereof to a pair of introduction side first common paths 93 are provided on the cylinder block 17. The paths 94, 94 are communicated at the other end thereof to the opposite ends of a introduction side second common path 95 provided in the front wall of the cylinder block 17 and extending in the cylinder arrangement direction.

Figure 15:
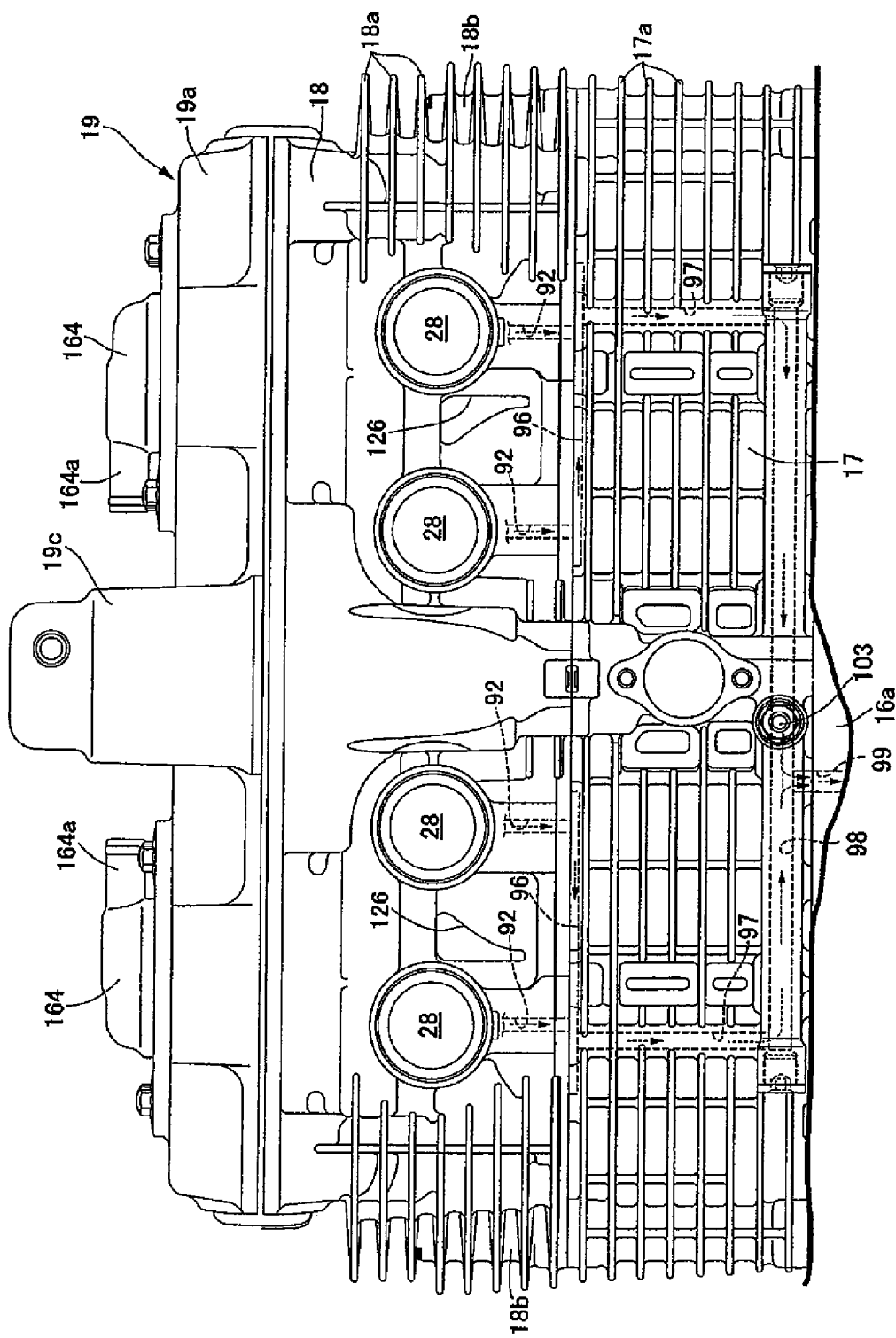
FIG. 15 is a view as viewed in the direction indicated by an arrow 15 of FIG. 3.

Referring also to FIG. 15, the derivation side oil paths 92 . . . of the first and second cylinders C1 and C2 are communicated with a derivation side first common path 96 formed between the cylinder block 17 and the cylinder head 18 at a location corresponding to the first and second cylinders C1 and C2. The derivation side oil paths 92 . . . of the third and fourth cylinders C3 and C4 . . . are communicated with the derivation side first common path 96 formed between the cylinder block 17 and the cylinder head 18 at a location corresponding to the third and fourth cylinders C3 and C4, . . . .

Further, a pair of paths 97, 97 individually communicated at one end thereof with a pair of derivation side first common paths 96, 96 and extending upwardly and downwardly are provided on the cylinder block 17. The paths 97, 97 are communicated at the other end thereof to the opposite ends of a derivation side second common path 98 provided in the front wall of the cylinder block 17 in such a manner as to extend in the cylinder arrangement direction over the first to fourth cylinders C1 to C4. Further, a path 99 extending upwardly and downwardly and communicated at one end thereof with a substantially central portion of the derivation side second common path 98 is provided in the upper case half 16a of the crankcase 16.

A pipe member 100 extending upwardly and downwardly and placing a lower end opening thereof in the oil pan 20 is fitted liquid tight with a lower end portion of the path 99 at an upper end portion thereof, and a support plate 101 secured to a lower portion of the pipe member 100 is fastened to the lower case half 16b of the crankcase 16 by a bolt 102. An oil temperature sensor 103 is provided on the front wall of the cylinder block 17 in such a manner as to detect the temperature of oil circulating along the derivation side second common path 98.

Referring again to FIG. 10, to a branching portion 139 provided on a cooling oil discharge pipe 138 communicating with a discharge port of the cooling oil pump 63 and accommodated in the oil pan 20, an oil cooling circuit 105 having an oil cooler 104 (refer to FIG. 14) and a bypass circuit 106 which bypasses the oil cooling circuit 105 are connected.

A thermostat 107 for controlling the circulation of oil discharged from the cooling oil pump 63 to the oil cooling circuit 105 and the bypass circuit 106 is disposed at the branching portion 139. Besides, the branching portion 139 is formed from a thermostat accommodating case 108 connected to the cooling oil discharge pipe 138 in such a manner as to accommodate and secure the thermostat 107.

The thermostat accommodating case 108 includes an upper case 109 of a bottomed cylindrical shape open at a lower portion thereof and a lower case 110 formed in a bottomed cylindrical shape open at an upper portion thereof and fitted from below with the upper case 109. The thermostat accommodating case 108 is attached at a lower portion thereof to the oil pan 20.

A connecting pipe 112 of a bottomed cylindrical shape extending in a mounting and dismounting direction of the oil pan 20 on and from the crankcase 16, that is, in the upward and downward direction and connecting to the cooling oil discharge pipe 138 is fitted at a lower portion thereof liquid tight with an upper portion of the thermostat accommodating case 108. An upper end closed portion of the connecting pipe 112 is abutted by a plug member 114 secured to the crankcase 16 in such a manner as to close up a lower end portion of a communicating hole 113 provided in the crankcase 16 in such a manner as to communicate the oil filter exit path 73 extending from a central portion of the oil filter 71 with the main gallery 72.

A relief valve 115 is connected to the discharge port of the lubricating oil pump 64. The relief valve 115 is fitted at an upper portion thereof with the crankcase 16 liquid tight from below in such a manner as to be connected to an entrance side path 116 provided in the crankcase 16 such that the lubricating discharge pipe 69 connecting to the lubricating oil pump 64 is connected to the oil filter 71.

An arcuate supporting projection 109a for abutting with and supporting a lower end of the relief valve 115 is provided in a projecting manner on the upper case 109 of the thermostat accommodating case 108 attached to the oil pan 20 coupled to the bottom of the crank case 116.

The oil cooling circuit 105 includes a first oil conduit 119 connected at one end portion thereof to the thermostat accommodating case 108 and connected and supported at the other end thereof to and by an inner face of the front wall of the crankcase 16, a second oil conductor 120 connected at an end portion thereof to the inner face of the front wall of the crankcase 16 in such a manner as to connect to the other end of the first oil conduit 119 and connected at the other end portion thereof to the oil cooler 104 as shown in FIG. 14, and a third oil conduit 121 for deriving oil cooled by the oil cooler 104 from the oil cooler 104. The oil cooler 104 is supported on the down tubes 27 . . . of the vehicle body frame F in such a manner as to be positioned upwardly with respect to the cylinder block 17 of the engine body 15 and forwardly with respect to the engine body 15.

The bypass circuit 106 includes a fourth oil conduit 124 connected at an end portion thereof to the thermostat accommodating case 108 and connected and supported at the other end portion thereof to and by the inner face of the front tall of the crankcase 16, and a fifth oil conduit 125 connected at one end thereof to the outer face of the front wall of the crankcase 16 at a position at which the oil filter 71 is sandwiched by a connecting point of the second oil conductor 120 to the crankcase 16 and the fifth oil conduit 125 and communicating with the fourth oil conduit 124. The fifth oil conduit 125 is communicated at the other end thereof with a central portion of the introduction side second common path 95.

Further, the third oil conduit 121 which forms part of the oil cooling circuit 105 and extends downwardly from the oil cooler 104 is communicated, at a lower end portion thereof with the introduction side second common path 95. In particular, the oil cooling circuit 105 having the oil cooler 104 for cooling part of oil discharged from the cooling oil pump 63 for introducing the oil cooled by the oil cooler 104 to the introduction side second common path 95 is provided between the cooling oil pump 63 and the introduction side second common path 95.

A pair of drain holes 135, 135 for discharging water entering the plug insertion hole 89 to the upper face side of the cylinder head 18, that is, to the recessed portion 47 side, are provided in the lid member 83 as shown in FIG. 12. The drain holes 135 . . . and the cooling fins 83a . . . are formed such that they are symmetrical with respect to a plane which extends perpendicularly to the cylinder arrangement direction and passes the cylinder axial line CL so that, even if the forward and backward directions of the lid member 83 with respect to the cylinder head 18 are reversed from each other, the relative posture thereof with respect to the cylinder head 18 is same.

The drain holes 135 . . . are formed such that the drain hole 135 disposed on the front side in a state wherein the lid member 83 is attached to the cylinder head 18 of the engine body 15 whose cylinder axial line CL is inclined forwardly extends horizontally or forwardly downwards.

Figure 16:
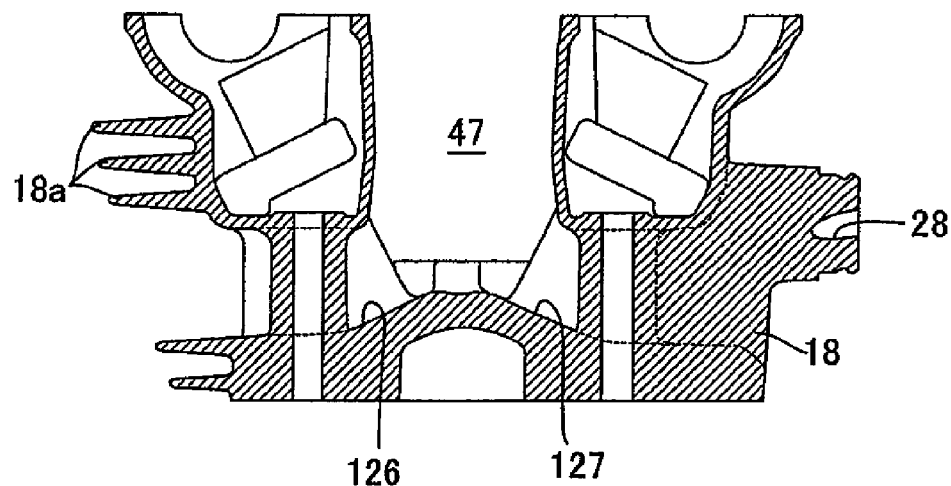
FIG. 16 is a sectional view of a cylinder head taken along line 16-16 of FIG. 6.

Referring to FIG. 16, traveling wind communicating holes 126, 126 opened at one end thereof to the front face of the cylinder head 18 and opened at the other end thereof to the plug attachment recessed portions 47 . . . and traveling wind communicating holes 127, 127 opened at one end thereof to the plug attachment recessed portions 47 . . . and opened at the other end thereof to the rear face of the cylinder head 18 are provided between the first and second cylinders C1 and C2 and between the third and fourth cylinders C3 and C4 . . . of the cylinder head 18 such that, when the motorcycle travels, traveling wind may be circuited therein.

Accordingly, water gathered at portions of the plug attachment recessed portions 47, 47 corresponding to the second and third cylinders C2 and C3 and water discharged from the drain holes 135 . . . of the second and third cylinders C2 and C3 to the plug attachment recessed portions 47, 47 are discharged from the traveling wind communicating holes 126 . . . which extend forwardly downwards from between the traveling wind communicating holes 126 . . . and 127 . . . to the front face side of the cylinder head 18 as indicated arrow marks in FIG. 6.

Meanwhile, water gathered in the plug attachment recessed portions 47, 47 at portions on the cylinders at the opposite ends in the cylinder arrangement direction, that is, on the first and fourth cylinders C1 and C4 and water discharged from the drain holes 135 . . . of the lid members 83 . . . of the first and fourth cylinders C1 and C4 to the plug attachment recessed portions 47, 47 are difficult to communicate with the traveling wind communicating hole 126 side.

Therefore, first drain paths 128, 128 for introducing water from the plug attachment recessed portions 47 . . . to the cylinder block 17 side are formed in the cylinder head 18 at the opposite end portions in the cylinder arrangement direction in such a manner as to be open to the upper face of the cylinder head 18, and second drain paths 129 . . . connecting to the first drain paths 128 . . . are provided on the cylinder block 17 side in such a manner as to be open to the front face or the rear face of the cylinder block 17, in the present working example 1, to the front face.

In addition, the first drain path 128 is provided on the cylinder block 17 in such a manner as to extend in a direction along the cylinder axial line CL, and is disposed on the inner side of a plurality of cylinder head side cooling fins 18a, 18a . . . provided in a projecting manner on a side face of the cylinder head 18 and is disposed in such a manner as to be positioned adjacent from the inner side to vertical ribs 18b which interconnect the plural cylinder head side cooling fins 18a, 18a, . . . .

Further, the first drain path 128 is formed such that it has an arcuate transverse sectional shape extending along the outer circumference of a cylinder bore 22 as viewed from a direction along the cylinder axial line CL.

Figure 17:
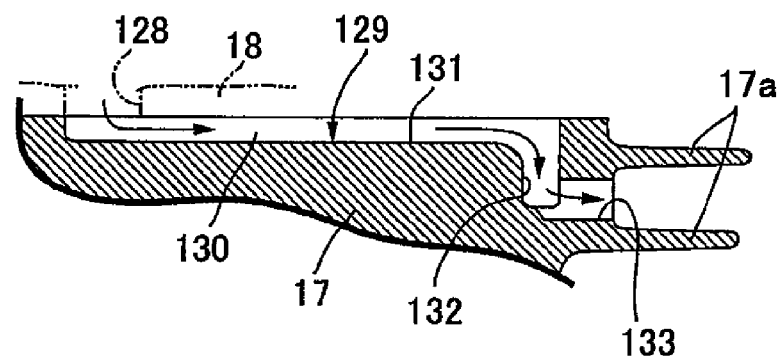
FIG. 17 is a sectional view taken along line 17-17 of FIG. 5.

Referring to FIG. 17, a path portion 130 which forms part of a second drain path 129 is formed from a groove 131 provided on a deck face 17b of the cylinder block 17 and communicated at one end thereof with the first drain path 128, and the cylinder head 18 coupled to the deck face 17b. The second drain path 129 is formed from the path portion 130 described hereinabove, a vertical hole 132 provided in the cylinder head 18 so as to extend in a direction parallel to the cylinder axial line CL and having an end communicated with the other end of the groove 131, and a transverse hole 133 provided in the cylinder block 17 in such a manner as to be communicated at an end thereof with the other end of the vertical hole 132 and opened at the other end thereof to the front face of the cylinder block 17.

The transverse hole 133 is situated between a pair of cylinder block side cooling fins 17a, 17a . . . which are positioned adjacent each other from among the plural cylinder block side cooling fins 17a, 17a . . . provided in a projecting manner on the side face of the cylinder block 17.

Now, operation of the present working example 1 is described.

The reed valves 160 . . . for controlling supply of secondary air to the exhaust system are disposed on the head cover 19. The enlarged members 162 . . . extended to the exhaust side camshaft 42E so as to form the reed valve chambers 161 . . . for accommodating the reed valves 160 . . . therein are provided integrally at a portion of the head cover 19 at which the reed valves 160 . . . are disposed. The recessed portion 163 into which part of the main enlarged member 162 fitted is provided on the exhaust side cam cap 41E fastened to the cylinder head 18 such that it cooperates with the cylinder head 18 to support the exhaust side camshaft 42E for rotation.

Therefore, the extended amount of the enlarged members 162 to the exhaust side camshaft 42E side can be increased while avoiding interference of the exhaust side camshaft 42E with the exhaust side cams 170 . . . and interference of the exhaust side camshaft 42E with the exhaust side cam cap 41E, and the volume of the reed valve chambers 161 . . . can be assured without swelling the enlarged members 162 . . . to the outer side of the head cover 19.

Further, since the exhaust side cam cap 41E has a pair of bearing portions 171, 171 which sandwich a plurality of, for example, a pair of exhaust side cams 170 . . . provided on the exhaust side camshaft 42E and cooperate with the cylinder head 18 to support the exhaust side camshaft 42E for rotation, and a connecting portion 172 integrated with the bearing portions 171 . . . for connecting both bearing portions 171 . . . to each other and the recessed portion 163 is provided on the connecting portion 172, it can be avoided that the supporting strength of the exhaust side camshaft 42E by the exhaust side cam cap 41E is dropped by provision of the recessed portion 163.

In addition, since the extending portions 173 . . . are provided on the connecting portion 172 such that part of the enlarged members 162 is disposed thereon, it is possible to position the enlarged members 162 nearer to the exhaust side camshaft 42E while avoiding interference with the exhaust side cam cap 41E, and reduction in weight by the enlarged members 162 can be anticipated within a range within which the strength of the exhaust side cam cap 41E does not drop.

Since the second main enlarged member 162a disposed between the pair of exhaust side cams 170 . . . disposed on the exhaust side camshaft 42E are provided integrally on the enlarged members 162 such that it is extended further from the enlarged members 162 to the exhaust side camshaft 42E side, the volume of the reed valve chambers 161 . . . can be further increased while avoiding interference with the exhaust side cams 170, . . . .

Since the second main enlarged member 162a is formed such that it is extended to the exhaust side camshaft 42E side until it coincides with the locus TC of rotation having a greater diameter from between the loci of rotation of the outer circumferences of the pair of exhaust side cams 170 . . . as viewed from the axial direction of the exhaust side camshaft 42E, the second main enlarged member 162a can be positioned more closely to the exhaust side camshaft 42E side to assure the volume of the reed valve chambers 161, . . . .

Further, since the reinforcing bridge 174 is provided integrally on the connecting portion 172 of the exhaust side cam cap 41E in such a manner as to be disposed between the exhaust side camshaft 42E and the enlarged members 162 and the extending portions 173, 173 are disposed on the opposite sides of the reinforcing bridge 174, the connecting portion 172 of the exhaust side cam cap 41E can be reinforced not to influence on the main enlarged member 162.

Further, since a pair of reed valve chambers 161 . . . individually corresponding to a plurality of, for example, a pair of, reed valves 160 . . . disposed on the head cover 19 positioned adjacent each other are formed in a mutually adjacent relationship in the enlarged members 162, compact arrangement of the reed valves 160 . . . and the reed valve chambers 161 . . . can be realized.

Further, to the cylinder head 18, the lid members 83 . . . having the plug insertion holes 89 . . . and the drain holes 135 . . . for draining water from the plug insertion holes 89 . . . are fastened for the individual cylinders C1 to C4, and the first drain paths 128 . . . for introducing water discharged from the plug insertion holes 89 . . . of the lid members 83 . . . corresponding to the first and fourth cylinders C1 and C4 to the cylinder block 17 side are provided in the cylinder head 18 while the second drain paths 129 . . . connecting to the first drain paths 128 . . . are provided on the cylinder block 17 side in such a manner as to be open to the front face of the cylinder block 17.

However, the path portion 130 which forms part of the second drain path 129 is formed from the groove 131 provided on the deck face 17b of the cylinder block 17 with one end thereof communicated with the first drain path 128 and the cylinder head 18 coupled to the deck face 17b. Therefore, even where interference with another member becomes a problem if a portion of the second drain path 129 near to the cylinder block 17 is formed linearly, the groove 131 can be crooked freely. Accordingly, it is easy to avoid interference with another member and it is possible to raise the degree of freedom in setting of the water draining direction.

Further, since the second drain path 129 includes the path portion 130, the vertical hole 132 provided in the cylinder block 17 so as to extend in a direction parallel to the cylinder axial line CL and communicated at an end thereof with the other end of the groove 131, and the transverse hole 133 provided on the cylinder block 17 such that it is communicated at an end thereof with the other end of the vertical hole 132 and is open at the other end thereof to the front face of the cylinder block 17.

Therefore, the structure that water is discharged to the outside from the front face of the cylinder block 17 at a position spaced from the deck face 17b of the cylinder block 17 and the opposite ends of the groove 131 are closed, and consequently, drop of the strength of the cylinder block 17 by provision of the groove 131 can be suppressed.

Further, since the transverse hole 133 is disposed between a pair of cylinder block side cooling fins 17a, 17a which are positioned adjacent each other from among a plurality of cylinder block side cooling fins 17a . . . provided in a projecting manner on a side face of the cylinder block 17 in a spaced relationship from each other in a direction along the cylinder axial line CL, the opening end of the transverse hole 133 can be made less conspicuous and the influence of the disposition of the transverse hole 133 on the shape of the cylinder block side cooling fins 17a, 17a . . . which have an influence on the appearance of the internal combustion engine can be suppressed.

Since the first drain paths 128 are provided on the inner side of the plural cylinder head side cooling fins 18a, 18a . . . provided in a projecting manner on the side face of the cylinder head 18 in a spaced relationship in a direction along the cylinder axial line CL and is provided on the cylinder head 18 such that it extends in the direction along the cylinder axial line CL, the influence of the provision of the first drain paths 128 on the shape of the cylinder head side cooling fins 18a, 18a . . . can be suppressed and deterioration of the appearance of the internal combustion engine can be prevented.

Further, since the vertical ribs 18b which interconnect the plural cylinder head side cooling fins 18a, 18a . . . are provided on the cylinder head 18 and the first drain paths 128 are disposed such that they are positioned adjacent the vertical ribs 18b from the inner side, a drop of the intensity of the cylinder head 18 by the provision of the first drain paths 128 can be suppressed.

Further, since water is discharged from the plug insertion holes 89 . . . of the lid members 83 . . . corresponding to the first and fourth cylinders C1 and C4 to the upper face of the cylinder head 18 through the drain holes 135 . . . and, while the water flows along a ceiling portion of the combustion chambers 24 formed between the cylinder head 18 and the cylinder block 17, the first drain paths 128 . . . which are open at an end thereof to the upper face of the cylinder head 18 are formed so as to have an arcuate transverse cross section extending along the outer circumference of the cylinder bores 22 as viewed from a direction along the cylinder axial line CL, the water discharged to the upper face of the cylinder head 18 can be introduced to the first drain paths 128 side without residing there as far as possible.

While an embodiment of the present invention has been described, the present invention is not restricted to the embodiment described above but various changes of design can be carried out without departing from the present invention as described in the claims.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An internal combustion engine, comprising
 a cylinder head;
 an exhaust system;
 a head cover cooperating with said cylinder head for forming a valve motion chamber;
 a reed valve for controlling supply of secondary air to the exhaust system; said reed valve being disposed on said head cover;
 a cam cap fastened to said cylinder head; and
 a valve motion control apparatus disposed in said valve motion chamber, said valve motion control apparatus comprising:
 a camshaft; and
 a main enlarged member extended towards said camshaft for forming a reed valve chamber for accommodating said reed valve therein; said main enlarged member being integrally provided on said head cover at a location at which said reed valve is disposed;
 wherein said cam cap includes a recessed portion formed thereon;
 and wherein said recessed portion in which a portion of the main enlarged member is inserted is provided on the cam cap fastened to said cylinder head so as to cooperate with said cylinder head for rotatably supporting said camshaft.

2. An internal combustion engine according to claim 1, wherein said cam cap comprises
 a pair of bearing portions for sandwiching a plurality of cams provided on said camshaft therebetween, and for cooperating with said cylinder head for rotatably supporting said camshaft; and
 a connecting portion integrated with said bearing portions for operatively connecting both of said bearing portions to each other;
 wherein said recessed portion is provided on said connecting portion.

3. An internal combustion engine according to claim 2, wherein said cam cap further comprises an extending portion provided on said connecting portion such that a portion of said main enlarged member is disposed on the extending portion.

4. An internal combustion engine according to claim 2, wherein said main enlarged member has a second enlarged member integrally provided thereon; and wherein said second enlarged member is disposed between said pair of cams provided on said camshaft, and wherein said second enlarged member is further extended from said main enlarged member towards said camshaft.

5. An internal combustion engine according to claim 4, wherein said second enlarged member is extended towards said camshaft such that said second enlarged member coincides with a locus of rotation of a greater diameter formed between loci of rotation of outer peripheries of said pair of cams when viewed from an axial direction of said camshaft.

6. An internal combustion engine according to claim 5, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

7. An internal combustion engine according to claim 4, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

8. An internal combustion engine according to claim 2, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

9. An internal combustion engine according to claim 1, wherein said cam cap comprises a connecting portion and an extending portion provided on the connecting portion; and
wherein a portion of said main enlarged member is disposed on said extending portion.

10. An internal combustion engine according to claim 9, wherein said main enlarged member has a second enlarged member integrally provided thereon; and wherein said second enlarged member is disposed between said pair of cams provided on said camshaft, and wherein said second enlarged member is further extended from said main enlarged member towards said camshaft.

11. An internal combustion engine according to claim 9, further comprising a reinforcing bridge disposed between said camshaft and said main enlarged member; wherein said reinforcing bridge is provided integrally on said connecting portion such that said extending portion is disposed on the opposite sides of said reinforcing bridge.

12. An internal combustion engine according to claim 11, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

13. An internal combustion engine according to claim 9, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

14. An internal combustion engine according to claim 1, further comprising a plurality of reed valve chambers individually corresponding to a plurality of reed valves disposed in an adjacent relationship to each other on said head cover; wherein said plurality of reed valve chambers are formed in a mutually adjacent relationship in said main enlarged member.

15. An internal combustion engine, comprising
a plurality of cylinders;
a cylinder head operatively connected to said plurality of cylinders;
an exhaust system;
a head cover cooperating with said cylinder head for forming a valve motion chamber;
a plurality of reed valves for controlling supply of secondary air to the exhaust system; said reed valves being disposed on said head cover;
a cam cap fastened to said cylinder head; and
a valve motion control apparatus disposed in said valve motion chamber;
said valve motion apparatus comprising
a camshaft; and
a main enlarged member extended towards said camshaft, and having a barrier for forming a plurality of reed valve chambers therein; each of said reed valve chambers accommodating respective one of said reed valves therein; said main enlarged member being integrally provided on said head cover at a location at which respective said reed valves are disposed;
wherein
said cam cap includes a recessed portion formed thereon; and
said recessed portion in which a portion of the main enlarged member is inserted is provided on the cam cap fastened to said cylinder head so as to cooperate with said cylinder head for rotatably supporting said camshaft.

16. An internal combustion engine according to claim 15, wherein
said cam cap comprises
a pair of bearing portions for sandwiching a plurality of cams provided on said camshaft therebetween, said pair of bearing portions being cooperating with said cylinder head for rotatably supporting said camshaft; and
a connecting portion integrated with said bearing portions for operatively connecting both of said bearing portions to each other;
wherein said recessed portion is provided on said connecting portion.

17. An internal combustion engine according to claim 16, wherein said cam further comprises an extending portion provided on said connecting portion such that a portion of said main enlarged member is disposed thereon;
wherein said main enlarged member has a second enlarged member integrally provided thereon; and wherein said second enlarged member is disposed between said pair of cams provided on said camshaft, and
wherein said second enlarged member is further extended from said main enlarged member towards said camshaft.

18. A motorcycle having a four cycle air-cooled internal combustion engine, said engine comprising
a plurality of cylinders;
a cylinder head operatively connected to said plurality of cylinders;
an exhaust system;
a head cover cooperating with said cylinder head for forming a valve motion chamber;
a plurality of reed valves for controlling supply of secondary air to the exhaust system; said reed valves being disposed on said head cover;
a cam cap fastened to said cylinder head; and
a valve motion control apparatus disposed in said valve motion chamber;
said valve motion apparatus comprising
a camshaft; and
a main enlarged member extended towards said camshaft, and having a barrier for forming a plurality of reed valve chambers therein; each of said reed valve chambers accommodating respective of one said reed valves therein; said main enlarged member being integrally provided on said head cover at a location at which said reed valves are disposed;

wherein
said cam cap comprises a recessed portion formed thereon; and
said recessed portion in which a portion of the main enlarged member is inserted is provided on the cam cap fastened to said cylinder head so as to cooperate with said cylinder head for rotatably supporting said camshaft.

19. A motorcycle according to claim 18, where said cam cap further comprises
a pair of bearing portions for sandwiching a plurality of cams provided on said camshaft therebetween, said bearing portion being cooperating with said cylinder head for rotatably supporting said camshaft; and
a connecting portion integrated with said bearing portions for operatively connecting both of said bearing portions to each other;
wherein said recessed portion is provided on said connecting portion.

20. A motorcycle according to claim 18, wherein
said cam cap comprises
a pair of bearing portions cooperating with said cylinder head for rotatably supporting said camshaft; and
a connecting portion integrated with said bearing portions for operatively connecting both of said bearing portions to each other;
an extending portion provided on said connecting portion such that a portion of said main enlarged member is disposed thereon;
wherein said main enlarged member comprises a second enlarged member integrally provided thereon; and
wherein said second enlarged member is disposed between said plurality of cams provided on said camshaft, and
said second enlarged member is further extended from said main enlarged member towards said camshaft; and
wherein said recessed portion is provided on said connecting portion.

\* \* \* \* \*